(12) United States Patent
Safai et al.

(10) Patent No.: US 10,240,909 B2
(45) Date of Patent: Mar. 26, 2019

(54) THREE-DIMENSIONAL GAP MEASUREMENT SYSTEMS AND METHODS

(71) Applicant: The Boeing Company, Chicago, IL (US)

(72) Inventors: Morteza Safai, Newcastle, WA (US); Melissa McQueen, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 63 days.

(21) Appl. No.: 15/295,628

(22) Filed: Oct. 17, 2016

(65) Prior Publication Data
US 2018/0106588 A1 Apr. 19, 2018

(51) Int. Cl.
G01B 7/14 (2006.01)
G01B 7/00 (2006.01)

(52) U.S. Cl.
CPC .............. *G01B 7/14* (2013.01); *G01B 7/001* (2013.01)

(58) Field of Classification Search
CPC ................................. G01B 7/14; G01B 7/001
USPC ..... 324/207.16, 207.15, 207.14, 207.11, 200
See application file for complete search history.

(56) References Cited

U.S. PATENT DOCUMENTS

| 4,967,485 A | 11/1990 | Brown et al. |
| 7,560,920 B1 | 7/2009 | Ouyang et al. |
| 7,730,789 B2 | 6/2010 | Odendahl |
| 8,756,792 B2 | 6/2014 | Boyl-Davis et al. |
| 2002/0130664 A1* | 9/2002 | Birken ..................... G01V 3/15 324/329 |
| 2007/0200563 A1* | 8/2007 | Daalmans .......... G01N 27/9006 324/237 |
| 2009/0151454 A1 | 6/2009 | Georgeson et al. |
| 2009/0154775 A1 | 6/2009 | Lea et al. |
| 2011/0095603 A1* | 4/2011 | Lee ..................... B60L 11/1803 307/10.1 |

(Continued)

FOREIGN PATENT DOCUMENTS

| EP | 0512796 | 5/1992 |
| JP | 2001056317 | 2/2001 |

OTHER PUBLICATIONS

Ahn et al., "Micromachined Planar Inductors on Silicon Wafers for MEMS Applications," *IEEE Transactions on Industrial Electronics* (Dec. 1998), vol. 45, No. 6, pp. 866-876.

(Continued)

*Primary Examiner* — Giovanni Astacio-Oquendo
(74) *Attorney, Agent, or Firm* — DASCENZO Intellectual Property Law, P.C.

(57) ABSTRACT

An electronic feeler gauge comprises a sensor blade, a transmitting system, and a receiving system. The sensor blade comprises transmission induction coils, reception induction coils, and measurement sites, spaced in two dimensions about the sensor blade. Each of the measurement sites is associated with at least one of the transmission induction coils and at least one of the reception induction coils. The transmitting system is configured to drive direct electrical current across the transmission induction coils to produce transmitted probe signals from the transmission induction coils. The receiving system is configured to receive response signals from the reception induction coils due to the transmitted probe signals.

67 Claims, 4 Drawing Sheets

(56) References Cited

U.S. PATENT DOCUMENTS

| | | | |
|---|---|---|---|
| 2011/0316473 A1* | 12/2011 | Yen | H02J 7/027 |
| | | | 320/107 |
| 2013/0185950 A1 | 7/2013 | Oode et al. | |
| 2014/0091787 A1* | 4/2014 | Hyodo | G01V 3/105 |
| | | | 324/236 |
| 2014/0109418 A1 | 4/2014 | Wu et al. | |
| 2015/0192410 A1 | 7/2015 | Bumgardner et al. | |
| 2016/0294213 A1* | 10/2016 | Morrison | H02J 9/061 |

OTHER PUBLICATIONS

UK Intellectual Property Office, Combined Search and Examination Report for related application GB1716995.4, dated Apr. 11, 2018.
Machine generated English translation of the abstract of JP 2001056317, downloaded from Espacenet.com on May 7, 2018.

* cited by examiner

THREE-DIMENSIONAL GAP MEASUREMENT SYSTEMS AND METHODS

TECHNICAL FIELD

The present disclosure relates to three-dimensional (3D) gap measurement systems and methods.

BACKGROUND

Aircraft assembly includes joining of complex, large-scale components in precise relationships, often necessary to efficiently transfer forces between such components. For example, wings and portions of the empennage (e.g., vertical stabilizer, horizontal stabilizer) may be pre-assembled and then after-attached to corresponding sections of the fuselage using load-bearing joints.

To achieve the appropriate fit between mating aircraft components, shims (also called fillers) are often used when joining parts together. Shims are used to occupy gaps (or voids) between joined parts. In many cases, such gaps or voids are specifically designed into the structure, as an example, to facilitate positioning and alignment of components during assembly. The use of shims to fill gaps during assembly improves fit between mating components.

In many cases, gaps are modelled with relatively uniform dimensions. However, in other situations, measurements across and along the gap may be non-uniform. In such cases, shims are typically custom-sized to fill the gap precisely and/or require special installation procedures. Measuring non-uniform gaps, preparing appropriate shims, and properly installing such shims is a time-consuming and tedious process that increases manufacturing cycle time.

SUMMARY

Accordingly, apparatuses and methods, intended to address at least the above-identified concerns, would find utility.

The following is a non-exhaustive list of examples, which may or may not be claimed, of the subject matter according to the invention.

One example of the subject matter according to the invention relates to an electronic feeler gauge that comprises a sensor blade, a transmitting system, and a receiving system. The sensor blade comprises transmission induction coils, reception induction coils, and measurement sites, spaced in two dimensions about the sensor blade. Each of the measurement sites is associated with at least one of the transmission induction coils and at least one of the reception induction coils. The transmitting system is configured to drive direct electrical current across the transmission induction coils to produce transmitted probe signals from the transmission induction coils. The receiving system is configured to receive response signals from the reception induction coils due to the transmitted probe signals.

Another example of the subject matter according to the invention relates to an electronic feeler gauge that comprises a sensor blade, a transmitting system, and a receiving system. The sensor blade comprises transmission induction coils, reception induction coils and measurement sites spaced in two dimensions about the sensor blade. Each of the measurement sites is associated with at least one of the transmission induction coils and at least one of the reception induction coils. The transmitting system is configured to drive modulated signals across the transmission induction coils to produce transmitted probe signals from the transmission induction coils. The receiving system is configured to receive response signals from the reception induction coils due to the transmitted probe signals.

Use of the electronic feeler gauge as set forth in either of the above examples allows for measuring a gap between a first surface (of a first workpiece) and a second surface (of a second workpiece) in three dimensions. With the sensor blade at least partially within the gap, measurement sites (spaced in two dimensions about the sensor blade) are configured to measure separation distances between the first surface and the second surface at the respective measurement sites. Measurement sites generally form a two-dimensional array across the sensor blade.

The thickness of the gap (also called the spacing of the gap) at each of the (two-dimensionally spaced) measurement sites may be measured to provide a thickness map of the gap across and along the gap (i.e., in the width and depth dimensions of the gap). The thickness map of the separation distances at measurement sites is a three dimensional map of the gap. The thickness map of the gap may be used to create and/or select shims that precisely fill the gap and/or that are non-uniform in one or more dimensions. Additionally or alternatively, the thickness map of the gap may be used to verify proper alignment and/or fit of mated components. Precise alignment and/or fit of components of an aerospace structure (with or without shims) facilitate reliable and efficient construction of the structure and reliable operation of the structure.

Yet another example of the subject matter according to the invention relates to a method of measuring separation distances within a gap. The method comprises inserting a sensor blade into the gap, defined by a first surface and a second surface, generating transmitted probe signals from transmission induction coils, receiving response signals with reception induction coils in response to transmitted probe signals, and determining separation distances between the first surface and the second surface at measurement sites based upon the response signals. The sensor blade comprises the transmission induction coils, the reception induction coils, and the measurement sites, spaced in two dimensions about the sensor blade. Each of the measurement sites is associated with at least one of the transmission induction coils and at least one of the reception induction coils.

The above method permits measuring the separation distances within the gap which may be used to select one or more shims to fill the gap, to form one or more shims to fill the gap, and/or to fill the gap with one or more shims. Additionally or alternatively, the above method may be used to verify proper assembly of components (e.g., a first workpiece and a second workpiece) and/or proper assembly of a shim within the gap. The above method may result in a 3D measurement of the gap (e.g., a 3D virtual model).

BRIEF DESCRIPTION OF THE DRAWINGS

Figure 1:
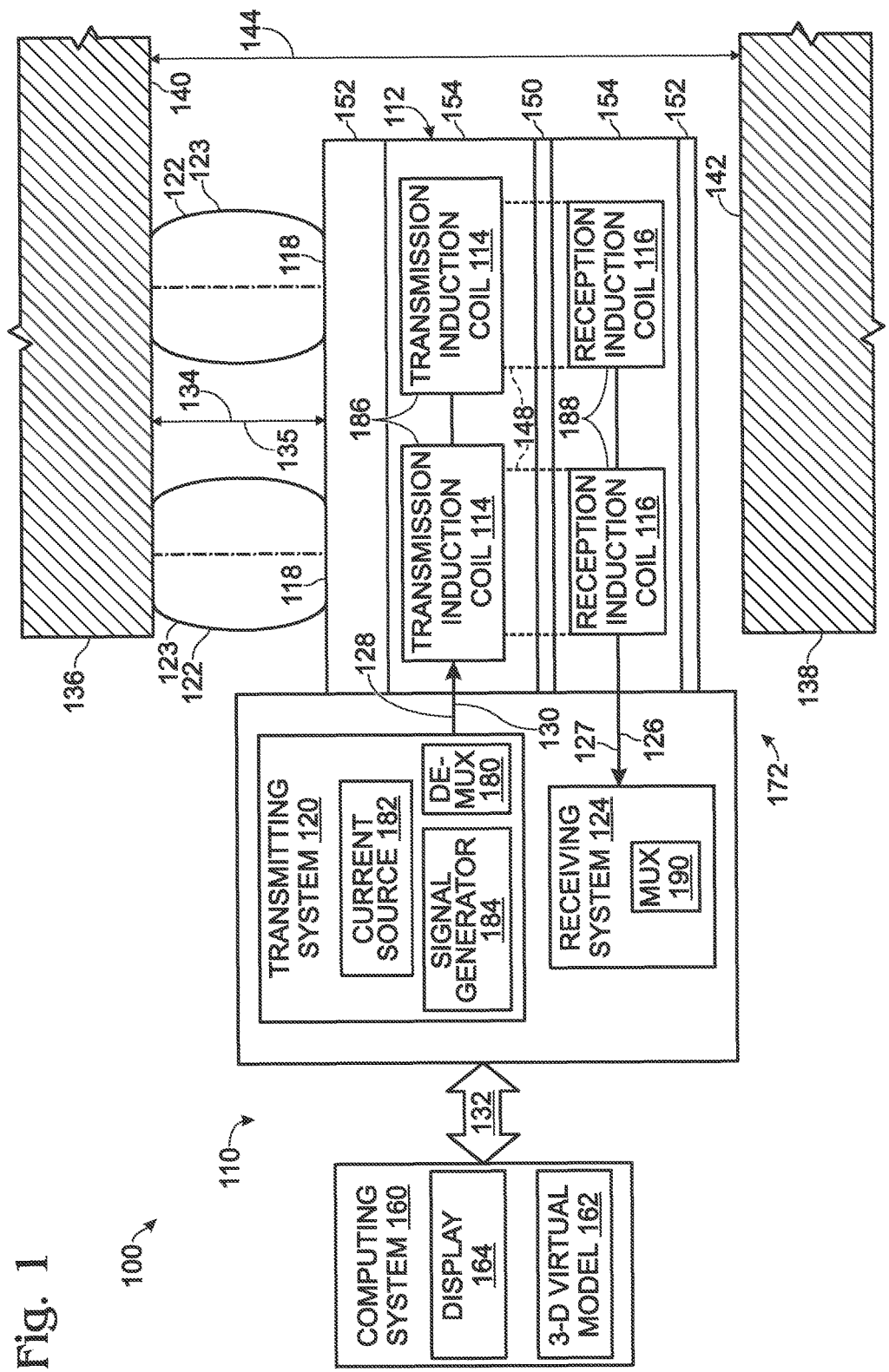
Figure 2:
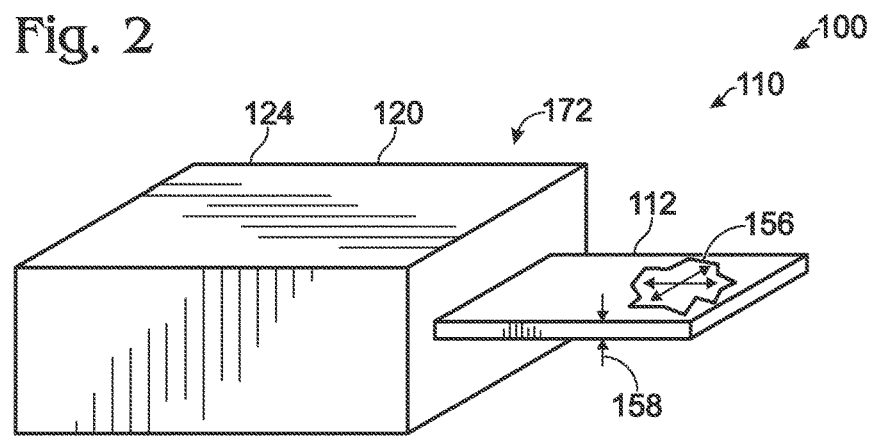
Figure 3:
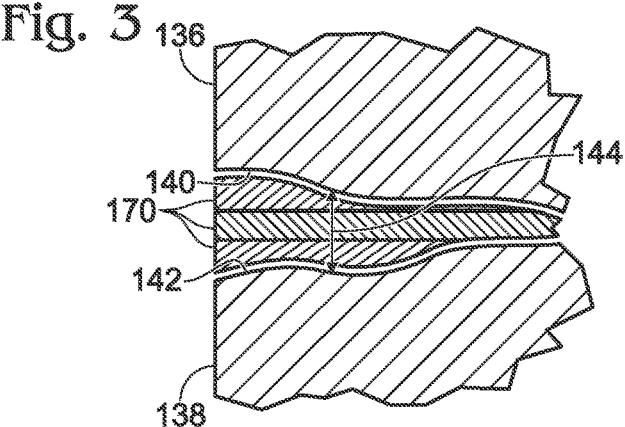
Figure 4:
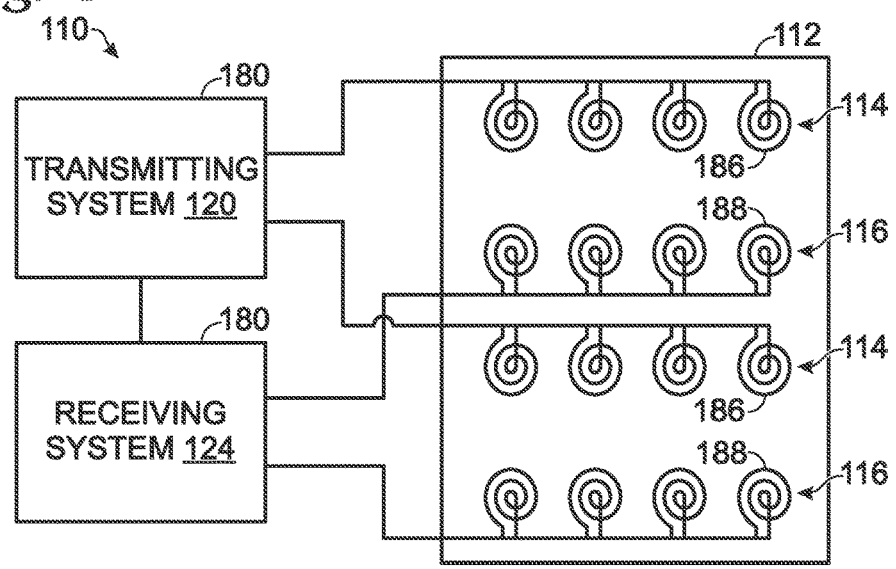
Figure 5:
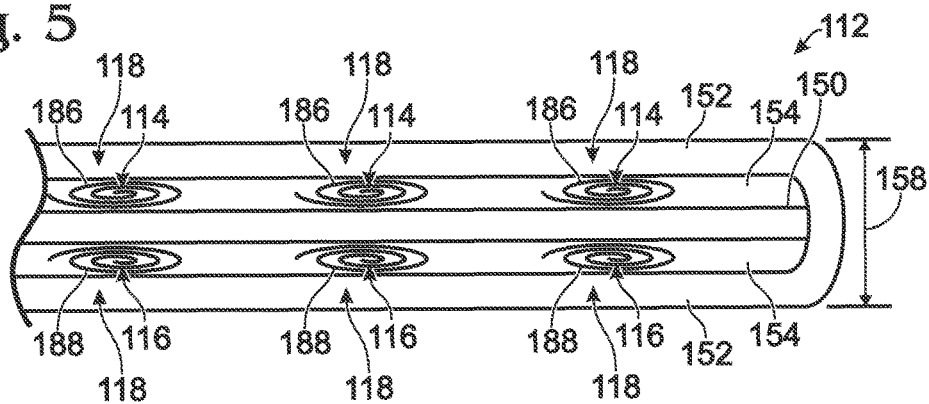
Figure 6:
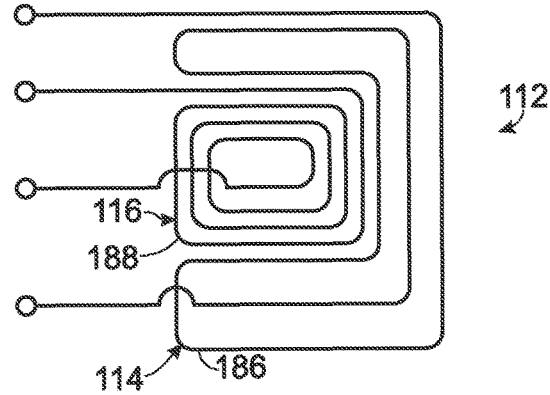
Figure 7:
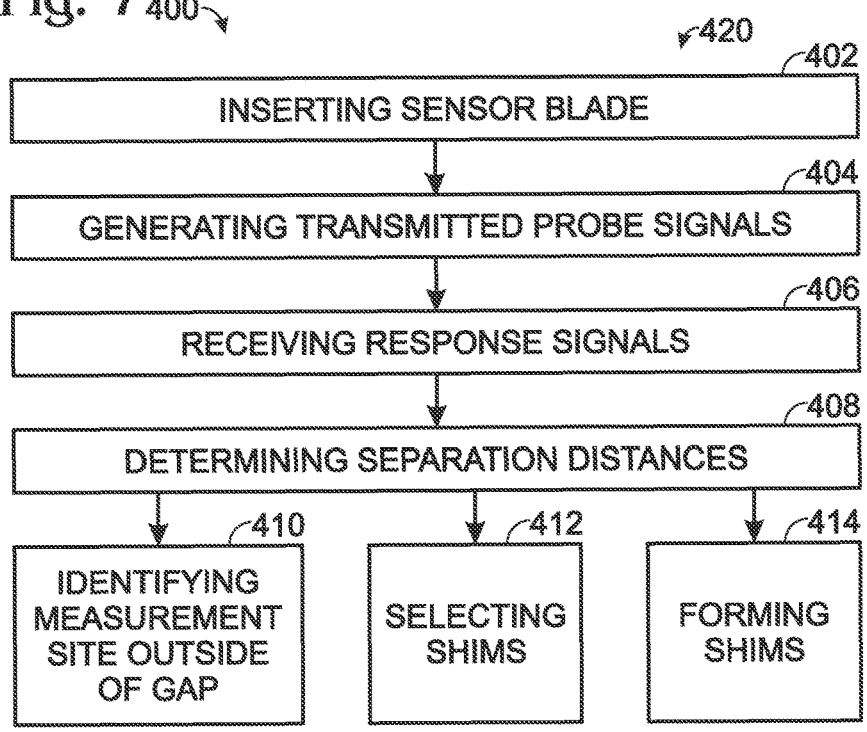
Figure 8:
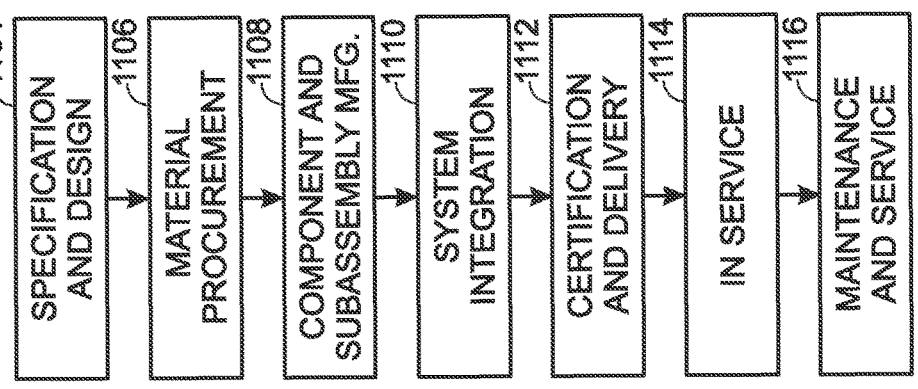

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a block diagram of an electronic feeler-gauge system, according to one or more examples of the present disclosure;

FIG. 2 is a schematic, perspective view of the electronic feeler gauge of FIG. 1, according to one or more examples of the present disclosure;

FIG. 3 is a schematic, cross-sectional view of shims installed in a gap between two workpieces, according to one or more examples of the present disclosure;

FIG. 4 is a schematic block diagram of an electronic-feeler gauge system, according to one or more examples of the present disclosure;

FIG. 5 is a schematic, cross-sectional view of an example of a sensor blade of an electronic feeler gauge of FIG. 1 or FIG. 4, according to one or more examples of the present disclosure;

FIG. 6 is a schematic block diagram of a sensor blade of an electronic feeler gauge of FIG. 1 or FIG. 4, according to one or more examples of the present disclosure;

FIG. 7 is a block diagram of a method of measuring separation distances within a gap, according to one or more examples of the present disclosure;

FIG. 8 is a block diagram of aircraft production and service methodology; and

Figure 9:
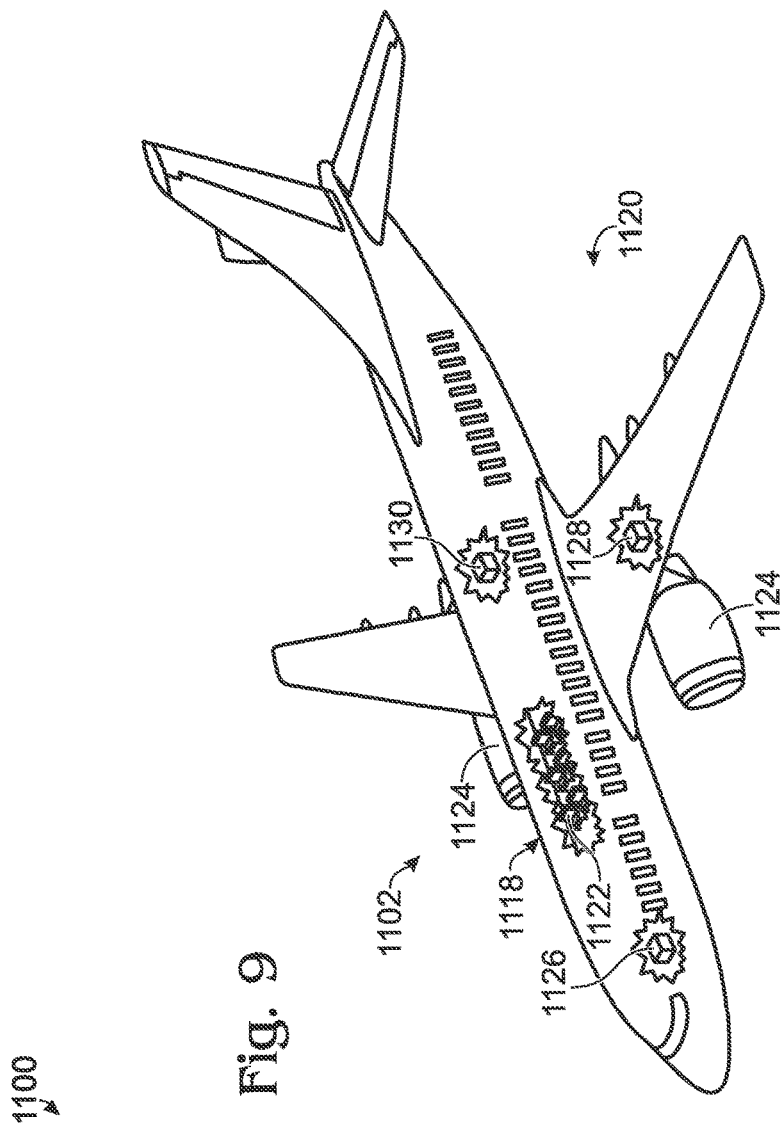

FIG. 9 is a schematic illustration of an aircraft.

DETAILED DESCRIPTION

In FIGS. 1-9, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1-9 may be combined in various ways without the need to include other features described in FIGS. 1-9, other drawing figures, and/or the accompanying disclosure, even though such combination or combinations are not explicitly illustrated herein. Similarly, additional features not limited to the examples presented, may be combined with some or all of the features shown and described herein.

In FIGS. 7-8, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 7-8 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1 and particularly to, e.g., FIGS. 2-6, electronic feeler gauge 110 is disclosed. Electronic feeler gauge 110 comprises sensor blade 112, transmitting system 120, and receiving system 124. Sensor blade 112 comprises transmission induction coils 114, reception induction coils 116, and measurement sites 118, spaced in two dimensions about sensor blade 112. Each of measurement sites 118 is associated with at least one of transmission induction coils 114 and at least one of reception induction coils 116. Transmitting system 120 is configured to drive direct electrical current 128 across transmission induction coils 114 to produce transmitted probe signals 122 from transmission induction coils 114. Receiving system 124 is configured to receive response signals 126 from reception induction coils 116 due to transmitted probe signals 122. The preceding subject matter of this paragraph characterizes example 1 of the present disclosure.

Use of electronic feeler gauge 110 as set forth in example 1 allows for measuring gap 144 between first surface 140 (of first workpiece 136) and second surface 142 (of second workpiece 138) in three dimensions. With sensor blade 112 at least partially within gap 144, measurement sites 118 (spaced in two dimensions about sensor blade 112) are configured to measure separation distances 134 between first surface 140 and second surface 142 at the respective measurement sites 118. Measurement sites 118 generally form a two-dimensional array across sensor blade 112.

The thickness of gap 144 (also called the spacing of gap 144) at each of (two-dimensionally spaced) measurement sites 118 may be measured to provide a thickness map of gap 144 across and along gap 144 (i.e., in the width and depth dimensions of gap 144). The thickness map of separation distances 134 at measurement sites 118 is a three dimensional map of gap 144. The thickness map of gap 144 may be used to create and/or select shims 170 that precisely fill gap 144 and/or that are non-uniform in one or more dimensions. Additionally or alternatively, the thickness map of gap 144 may be used to verify proper alignment and/or fit of mated components. Precise alignment and/or fit of components of an aerospace structure (with or without shims) facilitate reliable and efficient construction of the structure and reliable operation of the structure.

Measurement sites 118 are each associated with at least one of transmission induction coils 114 and at least one of reception induction coils 116. Typically, each measurement site 118 is associated with one of transmission induction coils 114 and one of reception induction coils 116. Each of the associated transmission induction coils 114 is configured to produce one of transmitted probe signals 122 at the associated measurement site 118. Each of the associated reception induction coils 116 is configured to receive one of response signals 126 at the associated measurement site 118.

Sensor blade 112 may be a rigid or a semi-flexible structure that comprises transmission induction coils 114 and reception induction coils 116. A rigid sensor blade 112 may be useful to fit into small gaps 144, to fit at an identified angle within gaps 144, and/or to resist buckling and/or folding within gaps 144. A semi-flexible sensor blade 112 may be useful to conform to gaps 144 and/or to fit into convoluted gaps 144. Semi-flexible sensor blade 112 may be rigid enough to avoid buckling and/or folding within gaps 144, and/or flexible enough to conform to concave and/or convex surfaces within gaps 144. Sensor blade 112 may have the form of a thin strip, sheet, and/or membrane. As shown in FIG. 2, sensor blade 112 has blade plane 156 and blade thickness 158.

Transmitting system 120, transmission induction coils 114, receiving system 124, and reception induction coils 116 are configured to probe and to sense gap 144, first surface 140, and/or second surface 142 by electrical induction. Hence, transmission induction coils 114 and reception induction coils 116 are induction coils each with a characteristic inductance.

Use of electrical induction to determine separation distances 134 permits non-contact sensing of the dimensions of gap 144. For example, sensor blade 112 is not required to contact either of first surface 140 or second surface 142 during measurement of gap 144. Use of electrical induction to determine separation distances 134 may be more robust to the presence of electrical noise, environmental effects, and/or surface contamination relative to other electrical sensing techniques (such as sensing electrical capacitance). Use of electrical induction to determine separation distances 134 may be more robust to surface finish variations and surface contamination relative to optical sensing techniques.

Transmission induction coils 114 are configured to transmit transmitted probe signals 122 according to direct electrical current 128 that may be driven across transmission induction coils 114 by transmitting system 120. Direct electrical current 128 is direct current (DC) that has a steady-state electrical current value. Direct electrical current 128 may be turned on or off, and the steady state electrical current value may be adjusted (e.g., between applications of direct electrical current 128). Transmitted probe signals 122 are magnetic induction fields that extend beyond sensor blade 112.

Interaction of transmitted probe signals 122 and the material or materials of first surface 140 and/or second surface 142 changes one or more properties of transmitted probe signals 122 (relative to no interaction). The interaction may cause intensification, attenuation, and/or displacement of transmitted probe signals 122 according to location and/or properties of the material(s), such as electrical conductivity and magnetic susceptibility.

Reception induction coils 116 are configured to receive response signals 126 according to the interaction of transmitted probe signals 122 and the material(s) of first surface 140 and/or second surface 142. Reception induction coils 116 are sensitive to electromagnetic fields and sense the electromagnetic fields by induction. Reception induction coils 116 may produce an electrical current and/or an electrical voltage in the presence of electromagnetic fields, in response to electromagnetic fields turning on or off, in response to movement of the electromagnetic fields, in response to movement of materials within the electromagnetic fields, and/or in response to movement of sensor blade 112 relative to gap 144.

Comparison of transmitted probe signals 122 to response signals 126 may be utilized to determine the presence or absence of materials (e.g., at first surface 140 and/or at second surface 142) and/or the distance between materials (e.g., separation distance 134 between first surface 140 and second surface 142). Generally, the measurements of separation distances 134 are measurements at measurement sites 118 based upon response signals 126 and/or comparisons of response signals 126 to transmitted probe signals 122 at measurement sites 118.

Transmitted probe signals 122 and measured gap distances (thicknesses) generally are between first surface 140 and second surface 142. In some examples, transmitted probe signals 122 and/or measured gap distances may be between sensor blade 112 and first surface 140, and/or between sensor blade 112 and second surface 142. For example, electronic feeler gauge 110 and/or sensor blade 112 may be configured to measure gap distances between sensor blade 112 and first surface 140, and configured to contact second surface 142 with sensor blade 112. In such a configuration, separation distances 134 are the measured gap distances plus blade thickness 158 of sensor blade 112. As another example, electronic feeler gauge 110 and/or sensor blade 112 may be configured to independently measure gap distances between sensor blade 112 and first surface 140 (a first gap distance), and between sensor blade 112 and second surface 142 (a second gap distance). In such a configuration, separation distances 134 are the measured (first and second) gap distances plus blade thickness 158 of sensor blade 112. Transmission induction coils 114, reception induction coils 116, and/or measurement sites 118 may be associated with one or both of first surface 140 and second surface 142.

As shown in the example of FIG. 1, electronic feeler gauge 110 may be installed into gap 144 and may be a portion of electronic feeler gauge system 100 that comprises electronic feeler gauge 110 installed into gap 144.

The following subject matter of this paragraph characterizes example 2 of the present disclosure, wherein example 2 also includes the subject matter according to example 1, above. Referring generally to FIG. 1 and particularly to, e.g., FIGS. 2-6, transmitting system 120 comprises current source 182, configured to produce direct electrical current 128, driven across transmission induction coils 114.

Current source 182 produces direct electrical current 128 for each of transmission induction coils 114 to produce transmitted probe signals 122. Current source 182 may be an electrical power supply configured to provide a voltage and/or an electrical current. Current source 182 may be configured to regulate and/or control direct electrical current 128. Current source 182 may be configured to deliver direct electrical current 128 to each of transmission induction coils 114 and may be configured to deliver direct electrical current 128 to one or more of transmission induction coils 114 simultaneously. Generally, current source 182 is connected with a low resistance electrical path to transmission induction coils 114. Low resistance (e.g., less than 100 ohm) facilitates efficient electrical transmission of direct electrical current 128.

The following subject matter of this paragraph characterizes example 3 of the present disclosure, wherein example 3 also includes the subject matter according to any one of examples 1 to 2, above. Referring generally to FIG. 1 and particularly to, e.g., FIGS. 2-6, transmitted probe signals 122 are steady-state magnetic fields.

Steady-state magnetic fields generally are created by steady-state electrical current (i.e., direct electrical current 128) flowing through transmission induction coils 114. Steady-state magnetic fields permeate beyond transmission induction coils 114 into the space near sensor blade 112, measurement site 118, and transmission induction coil 114 associated with each steady-state magnetic field. Steady-state magnetic fields are distorted by and interact with metal, metallic materials, magnetic materials, magnetically permeable materials, and electrically conductive materials. Hence, transmitted probe signals 122 may be affected by the presence, type, and/or arrangement of first surface 140 and/or second surface 142 that include any such materials.

Generally, steady-state magnetic fields generated by transmission induction coils 114 have a field strength (intensity) that decreases in relation to an inverse power of the distance from transmission induction coils 114. The source strength and source-distance relation of each of the steady-state magnetic fields depends on the intensity of direct electrical current 128 and the configuration of transmission induction coil 114 that produce the steady-state magnetic field. The distance from transmission induction coils 114 at which the field strength of the steady-state magnetic fields has a predetermined value (e.g., a field strength corresponding to a minimum detectable value at reception induction coils 116) may be a characteristic sensing distance of sensor blade 112. The characteristic sensing distance may be at least 1 mm, at least 5 mm, at least 10 mm, and/or less than 100 mm. Thus, electronic feeler gauge 110 and sensor blade 112 may be configured to measure separation distances 134 of gaps 144 that are at least 1 mm, at least 5 mm, at least 10 mm, and/or less than 100 mm.

The following subject matter of this paragraph characterizes example 4 of the present disclosure, wherein example 4 also includes the subject matter according to any one of examples 1 to 3, above. Referring generally to FIG. 1 and particularly to, e.g., FIGS. 2-6, receiving system 124 is configured to generate separation distance signals 132 based upon response signals 126. Separation distance signals 132 are related to separation distances 134 at measurement sites 118 of sensor blade 112 between first surface 140 of first workpiece 136 and second surface 142 of second workpiece 138.

Electronic feeler gauge 110 may be used to measure gaps 144 between similar or dissimilar components such as first workpiece 136 and second workpiece 138. The materials of first workpiece 136 and second workpiece 138, and/or that form first surface 140 and second surface 142 of gap 144, may each independently be metal, metallic, conductive, magnetic, polymeric, and/or composite materials. The materials are not required to be electrically or magnetically conductive. Electronic feeler gauge 110 may be calibrated for different types of materials to produce reliable separation distance measurements regardless of the materials of first workpiece 136, of second workpiece 138, at first surface 140, and/or at second surface 142. Electronic feeler gauge 110 may be calibrated by inserting sensor blade 112 into a calibration gap of known size (thickness, and generally width and depth) and between known materials. The calibration gap may be formed in a calibration artifact (which also may be called a calibration tool). Calibration may include adjusting direct electrical current 128 supplied across transmission induction coils 114 and/or response signals 126 received by receiving system 124, as discussed further herein.

The following subject matter of this paragraph characterizes example 5 of the present disclosure, wherein example 5 also includes the subject matter according to example 4, above. Referring generally to FIG. 1 and particularly to, e.g., FIGS. 2-6, receiving system 124 is configured to receive response signals 126 when at least one of measurement sites 118 is within gap 144, defined by first surface 140 and second surface 142.

Sensor blade 112 may not entirely fit within gap 144 and/or may not be inserted entirely into gap 144. Measurement sites 118 within gap 144 may be used to measure separation distances 134 within gap 144. Measurement sites 118 outside of gap 144 may measure essentially no gap, an infinite separation distance, or a no signal condition. Receiving system 124 and/or electronic feeler gauge 110 may be configured to determine which measurement sites 118 are within gap 144 and which measurement sites 118 are outside of gap 144. Determining which measurement sites 118 are in and/or out of gap 144 may provide a measure and/or estimate of the depth of gap 144 and/or the cross sectional area of gap 144 (e.g., by providing the depth and/or area of sensor blade 112 within gap 144). Receiving system 124 and/or electronic feeler gauge 110 may be configured to measure separation distances 134 only if one or more of measurement sites 118 are within gap 144.

The following subject matter of this paragraph characterizes example 6 of the present disclosure, wherein example 6 also includes the subject matter according to any one of examples 1 to 5, above. Referring generally to FIG. 1 and particularly to, e.g., FIGS. 2-6, each of transmission induction coils 114 is individually electrically addressed by transmitting system 120.

Individually addressing transmission induction coils 114 permits operating one or more transmission induction coils 114 independently and/or at different times. Individual operation may comprise independently turning on, turning off, using different direct electrical current 128, and/or adjusting direct electrical current 128 for one or more (optionally all) of transmission induction coils 114. Transmission induction coils 114 may be operated (and/or electrically addressed) in groups such as rows, columns, and/or regions. Groups may be sparse, e.g., every fourth element, and/or may be irregular, e.g., a region within which an average of one out of every four elements is controlled together.

Individual operation of one or more (optionally each) of transmission induction coils 114 facilitates probing gap 144 with little to no cross talk (interaction such as interference) between different transmission induction coils 114 and/or measurement sites 118. Individual operation of one or more (optionally each) of transmission induction coils 114 facilitates independently adjusting the magnetic induction field produced by the independently controlled transmission induction coils 114. For example, direct electrical current 128 for each of transmission induction coils 114 may be adjusted such that each of transmission induction coils 114 produces a magnetic induction field of the same strength.

The following subject matter of this paragraph characterizes example 7 of the present disclosure, wherein example 7 also includes the subject matter according to any one of examples 1 to 6, above. Referring generally to FIG. 1 and particularly to, e.g., FIGS. 2-6, transmitting system 120 comprises de-multiplexer 180 to produce one of transmitted probe signals 122 at a different time than another one of transmitted probe signals 122.

De-multiplexer 180 of transmitting system 120 routes direct electrical current 128 from transmitting system 120 to at least one of transmission induction coils 114 to produce respective transmitted probe signals 122. Generally, de-multiplexer 180 of transmitting system 120 routes a single input signal (e.g., direct electrical current 128) to any one of multiple output destinations (e.g., one of transmission induction coils 114). Using de-multiplexer 180 facilitates efficient electrical design and facilitates the use of a single source (e.g., current source 182) to provide direct electrical current 128 to each of transmission induction coils 114.

Transmitting system 120 and/or de-multiplexer 180 may be configured to route direct electrical current 128 to different transmission induction coils 114 at different times. Thus, electronic feeler gauge 110 may be configured to produce different ones of transmitted probe signals 122 at different times. For example, each of transmission induction coils 114 may be sequentially delivered direct electrical current 128 to produce transmitted probe signals 122 at sequential measurement sites 118. Production of transmitted probe signals 122 at some measurement sites 118 while other measurement sites 118 have no transmitted probe signals 122 may reduce cross talk between different measurement sites 118 and/or transmission induction coils 114. De-multiplexer 180 may be configured to switch which of transmission induction coils 114 receive direct electrical current 128 while direct electrical current 128 is held steady (e.g., current source 182 produces a substantially constant direct electrical current 128).

The following subject matter of this paragraph characterizes example 8 of the present disclosure, wherein example 8 also includes the subject matter according to any one of examples 1 to 7, above. Referring generally to FIG. 1 and particularly to, e.g., FIGS. 2-6, transmitting system 120 is configured to multiplex transmitted probe signals 122 by time-division multiplexing.

Transmitting system 120 and/or de-multiplexer 180 may be configured to deliver direct electrical current 128 to transmission induction coils 114 to produce transmitted probe signals 122 one (or a group) at a time via time-division multiplexing. Hence, fewer than all (e.g., one) of transmission induction coils 114 will produce transmitted probe signals 122 at the same time. Production of transmitted probe signals 122 at different times may reduce cross talk between different measurement sites 118 and/or transmission induction coils 114.

Multiplexing is a switching scheme that routes a single input (or output) signal into (or from) multiple output (or input) signals, and, thus, may be described as a one-to-many switch (one input and multiple outputs) or a many-to-one switch (multiple inputs to one output). Time-division multiplexing is a multiplexing scheme in which the single input (or output) signal is connected to the multiple output (or input) signals according to time. Specifically, the single input (or output) signal is routed to one or a group of output (or input) signals for a period of time, then to another one or group of output (or input) signals for the next period of time, etc. until all output (or input) signals have been used. Then, the process repeats. A typical time-division multiplexing process switches the single input (or output) signal sequentially to each one of the output (or input) signals based on a timer so that each one of the output (or input) signals is connected at different points in time and for the same amount of time.

The following subject matter of this paragraph characterizes example 9 of the present disclosure, wherein example 9 also includes the subject matter according to any one of examples 1 to 8, above. Referring generally to FIG. 1 and particularly to, e.g., FIGS. 2-6, receiving system 124 is configured to receive at least one of response signals 126 for each of reception induction coils 116.

Each of reception induction coils 116 may respond to magnetic induction fields (from the transmitted probe signals 122 interacting with materials at gap 144) at respective measurement sites 118. Receiving system 124 may receive individual response signals 126 for each of reception induction coils 116 corresponding to measurement sites 118. Receiving at least one of response signals 126 for each of reception induction coils 116 facilitates determination of the interaction of the magnetic induction field at each of measurement sites 118 independently.

The following subject matter of this paragraph characterizes example 10 of the present disclosure, wherein example 10 also includes the subject matter according to any one of examples 1 to 9, above. Referring generally to FIG. 1 and particularly to, e.g., FIGS. 2-6, each of reception induction coils 116 is individually electrically addressed by receiving system 124.

Individually addressing reception induction coils 116 permits receiving one or more response signals 126 independently and/or at different times. Reception induction coils 116 may be utilized in groups such as rows, columns, and/or regions that correspond to active transmission induction coils 114 (i.e., transmission induction coils 114 that are producing transmitted probe signals 122). Additionally or alternatively, reception induction coils 116 may be individually electrically addressed to sample one or more of transmitted probe signals 122 at different ones of measurement sites 118 (e.g., sequentially or serially).

Individual utilization of one or more (optionally each) of reception induction coils 116 facilitates probing gap 144 with little to no cross talk between different transmission induction coils 114, reception induction coils 116, and/or measurement sites 118. For example, for each of measurement sites 118, associated transmission induction coil 114 may produce respective transmitted probe signal 122 at that measurement site 118 while neighboring transmission induction coils 114 are disabled (not being operated to produce transmitted probe signals 122). Associated reception induction coil 116 of that measurement site 118 (and/or neighboring reception induction coils 116 of neighboring measurement sites 118) may be utilized to receive respective transmitted probe signal 122 from the one of transmission induction coils 114 that is being operated without significant interference from other transmitted probe signals 122.

The following subject matter of this paragraph characterizes example 11 of the present disclosure, wherein example 11 also includes the subject matter according to any one of examples 1 to 10, above. Referring generally to FIG. 1 and particularly to, e.g., FIGS. 2-6, receiving system 124 comprises multiplexer 190 to receive one of response signals 126 at a different time than another one of response signals 126.

Multiplexer 190 of receiving system 124 routes response signals 126 from at least one of reception induction coils 116 to be measured within receiving system 124. Generally, multiplexer 190 of receiving system 124 routes any one of multiple input signals (e.g., any one of response signals 126 from respective reception induction coil 116) to a single output signal, which then may be further processed (e.g., by analog to digital conversion). Using multiplexer 190 facilitates efficient electrical design and facilitates the use of a single set of detection electronics to detect respective response signals 126 from all of reception induction coils 116.

Receiving system 124 and/or multiplexer 190 may be configured to route response signals 126 from different reception induction coils 116 at different times. Thus, electronic feeler gauge 110 may be configured to receive different ones of response signals 126 at different times. For example, each of reception induction coils 116 may be sequentially connected to receiving system 124 via multiplexer 190 to receive sequential response signals 126 from sequential measurement sites 118. Reception of response signals 126 from some measurement sites 118 while other measurement sites 118 deliver no response signals 126 may reduce cross talk between different measurement sites 118 and/or reception induction coils 116.

The following subject matter of this paragraph characterizes example 12 of the present disclosure, wherein example 12 also includes the subject matter according to any one of examples 1 to 11, above. Referring generally to FIG. 1 and particularly to, e.g., FIGS. 2-6, receiving system 124 is configured to multiplex response signals 126 by time-division multiplexing.

Receiving system 124 and/or multiplexer 190 may be configured to receive response signals 126 from reception induction coils 116 one (or a group) at a time via time-division multiplexing. Hence, fewer than all (e.g., one) of reception induction coils 116 will deliver response signals 126 at the same time. Reception of response signals 126 at different times may reduce cross talk between different measurement sites 118 and/or reception induction coils 116.

The following subject matter of this paragraph characterizes example 13 of the present disclosure, wherein example 13 also includes the subject matter according to any one of examples 1 to 12, above. Referring generally to FIG. 1 and particularly to, e.g., FIGS. 2-6, transmission induction coils 114 are equal in number to reception induction coils 116.

Generally, transmission induction coils 114 have a one-to-one relationship with reception induction coils 116. Each of measurement sites 118 may have one of transmission induction coils 114 and one of reception induction coils 116 at that measurement site 118. Each of reception induction coils 116 may be arranged and/or positioned to sense magnetic induction fields produced by one of transmission induction coils 114. Hence, each of measurement sites 118 may have a single one of transmission induction coils 114 and a single one of reception induction coils 116. Transmission induction coils 114 and reception induction coils 116 that are paired and/or configured to work in tandem may simplify the transmission and reception electronics (e.g., within transmitting system 120 and receiving system 124) and determination of separation distances 134 (by primarily comparing response signals 126 to transmitted probe signals 122 for the paired and/or tandem transmission induction coils 114 and reception induction coils 116).

The following subject matter of this paragraph characterizes example 14 of the present disclosure, wherein example 14 also includes the subject matter according to any one of examples 1 to 13, above. Referring generally to FIG. 1 and particularly to, e.g., FIGS. 2-6, reception induction coils 116 are interspersed among transmission induction coils 114 in sensor blade 112.

Transmission induction coils 114 may be spaced about sensor blade 112 to probe spaced-apart measurement sites 118 within gap 144. Reception induction coils 116 generally are proximate associated transmission induction coils 114 at measurement sites 118. Reception induction coils 116 may be co-located with transmission induction coils 114 in space not occupied by transmission induction coils 114, and, thus, may be interspersed among transmission induction coils 114. Co-locating and/or interspersing transmission induction coils 114 and reception induction coils 116 provides for more compact measurement sites 118 and/or a more compact sensor blade 112 (e.g., in area of blade plane 156, in blade thickness 158, and/or in volume of sensor blade 112). More compact measurement sites 118 permit a higher density of measurement sites 118 in sensor blade 112 and, hence, a higher resolution determination of separation distances 134 within gap 144.

Co-located and/or interspersed reception induction coils 116 may be located above, below, and/or beside transmission induction coils 114. For example, reception induction coils 116 and transmission induction coils 114 may be located within different coil layers 154 (as shown in the example of FIG. 5) or within the same coil layer 154. Additionally or alternatively, co-located and/or interspersed reception induction coils 116 may be located at least partially within the area occupied by transmission induction coils 114, or vice versa (e.g., as shown in the example of FIG. 6).

The following subject matter of this paragraph characterizes example 15 of the present disclosure, wherein example 15 also includes the subject matter according to any one of examples 1 to 14, above. Referring generally to FIG. 1 and particularly to, e.g., FIGS. 2-6, reception induction coils 116 are interdigitated with transmission induction coils 114 in sensor blade 112.

Reception induction coils 116 and transmission induction coils 114 may be interdigitated in sensor blade 112, e.g., as shown in the example of FIG. 6. Interdigitated reception induction coils 116 and transmission induction coils 114 provide for more compact measurement sites 118 and/or a more compact sensor blade 112 (e.g., in area of blade plane 156, in blade thickness 158, and/or in volume of sensor blade 112). More compact measurement sites 118 permit a higher density of measurement sites 118 in sensor blade 112 and, hence, a higher resolution determination of separation distances 134 within gap 144.

Interdigitated reception induction coils 116 and transmission induction coils 114 are intermingled in close relationship, typically in pairs of reception induction coils 116 and transmission induction coils 114 at each of measurement sites 118. Interdigitated induction coils may have one coil arranged next to another coil, one coil enclosing another coil, and/or one coil partially enclosing another coil (for example, transmission induction coil 114 of FIG. 6 partially encloses reception induction coil 116 of FIG. 6). Interdigitated induction coils may be intertwined, interleaved, interwoven, and/or interspersed with each other.

The following subject matter of this paragraph characterizes example 16 of the present disclosure, wherein example 16 also includes the subject matter according to any one of examples 1 to 15, above. Referring generally to FIG. 1 and particularly to, e.g., FIGS. 2-6, at least one of reception induction coils 116 overlaps with at least one of transmission induction coils 114 in sensor blade 112.

Some or all of reception induction coils 116 may overlap with some or all of transmission induction coils 114. Overlapping reception induction coils 116 and transmission induction coils 114 provide for more compact measurement sites 118 and/or a more compact sensor blade 112 (e.g., in area of blade plane 156, in blade thickness 158, and/or in volume of sensor blade 112). More compact measurement sites 118 permit a higher density of measurement sites 118 in sensor blade 112 and, hence, a higher resolution determination of separation distances 134 within gap 144.

Overlapping of reception induction coils 116 and transmission induction coils 114 is within blade plane 156 of sensor blade 112. Overlapping reception induction coils 116 and transmission induction coils 114 generally are spaced apart across blade thickness 158 and may be in different coil layers 154, as shown in the example of FIG. 5. Reception induction coils 116 and transmission induction coils 114 overlap in overlap regions 148. Overlap regions 148 are generally at measurement sites 118.

The following subject matter of this paragraph characterizes example 17 of the present disclosure, wherein example 17 also includes the subject matter according to example 16, above. Referring generally to FIG. 1 and particularly to, e.g., FIGS. 2-6, each of reception induction coils 116 overlaps with at least one of transmission induction coils 114 in sensor blade 112.

All of reception induction coils 116 may overlap corresponding transmission induction coils 114. Having all reception induction coils 116 each overlap with at least one of transmission induction coils 114 provides for all of measurement sites 118 to be compact and/or an even more compact sensor blade 112 than if only some of reception induction coils 116 overlap with transmission induction coils 114.

The following subject matter of this paragraph characterizes example 18 of the present disclosure, wherein example 18 also includes the subject matter according to any one of examples 1 to 17, above. Referring generally to FIG. 1 and particularly to, e.g., FIGS. 2-6, at least one of reception induction coils 116 and at least one of transmission induction coils 114 overlap in overlap region 148 and are separated by one or more dielectric layers 150 in overlap region 148.

At least where reception induction coils 116 and transmission induction coils 114 overlap (i.e., in overlap regions 148), reception induction coils 116 and transmission induction coils 114 are separated to avoid direct electrical connection between reception induction coils 116 and transmission induction coils 114. Dielectric layers 150 (as shown in the example of FIG. 5) are electrically insulating layers of sensor blade 112. More dielectric layers 150 may provide more electrical isolation and/or robustness against electrical breakdown than one dielectric layer 150. Dielectric layers 150 generally are very thin (e.g., less than 100 μm (micron), less than 10 μm, or less than 1 μm thick). Dielectric layers 150 generally are resilient enough to maintain dielectric integrity after flexing of sensor blade 112.

The following subject matter of this paragraph characterizes example 19 of the present disclosure, wherein example 19 also includes the subject matter according to any one of examples 1 to 18, above. Referring generally to FIG. 1 and particularly to, e.g., FIGS. 2-6, transmission induction coils 114 and reception induction coils 116 are separated by one or more dielectric layers 150.

In general, transmission induction coils 114 and reception induction coils 116 may be separated to avoid direct electrical connection between transmission induction coils 114 and reception induction coils 116. More dielectric layers 150 may provide more electrical isolation and/or robustness against electrical breakdown of one dielectric layer 150.

The following subject matter of this paragraph characterizes example 20 of the present disclosure, wherein example 20 also includes the subject matter according to example 19, above. Referring generally to FIG. 1 and particularly to, e.g., FIGS. 2-6, transmission induction coils 114 and reception induction coils 116 are formed on opposite sides of a single one of one or more dielectric layers 150.

Dielectric layers 150 each may be substrates that can support electromechanical structures. For example, electronic circuit elements may be deposited, screen printed, etched, and/or molded on dielectric layers 150. Transmission induction coils 114 and/or reception induction coils 116 may be formed on the same or different dielectric layers 150. In some examples, transmission induction coils 114 and reception induction coils 116 may be formed on opposite sides of a single one of dielectric layers 150 to reduce the total number of layers needed for sensor blade 112, to simplify production of sensor blade 112, and/or to simplify registration (relative placement) of transmission induction coils 114 and reception induction coils 116.

The following subject matter of this paragraph characterizes example 21 of the present disclosure, wherein example 21 also includes the subject matter according to any one of examples 1 to 20, above. Referring generally to FIG. 1 and particularly to, e.g., FIGS. 2-6, transmission induction coils 114 and reception induction coils 116 are located in different layers within sensor blade 112.

To simplify production of transmission induction coils 114, production of reception induction coils 116, and/or production of sensor blade 112, transmission induction coils 114 and reception induction coils 116 may be fabricated on and/or located in different layers within sensor blade 112. For example and as shown in FIG. 5, transmission induction coils 114 may be located in one coil layer 154 and reception induction coils 116 may be located in another coil layer 154. Each of coil layers 154 may be fabricated independently and then layered together to form sensor blade 112. Coil layers 154 may include dielectric material between and/or around each of transmission induction coils 114 and/or reception induction coils 116. Coil layers 154 may be layered together with or without intervening dielectric layers 150 provided that transmission induction coils 114 and reception induction coils 116 remain electrically isolated from each other. Coil layers 154 may be very thin (e.g., less than 100 μm, less than 10 μm, or less than 1 μm thick). Coil layers 154 generally are resilient enough to maintain integrity of transmission induction coils 114 and/or reception induction coils 116 after flexing of sensor blade 112.

The following subject matter of this paragraph characterizes example 22 of the present disclosure, wherein example 22 also includes the subject matter according to any one of examples 1 to 21, above. Referring generally to FIG. 1 and particularly to, e.g., FIGS. 2-6, transmission induction coils 114 comprise graphene.

Transmission induction coils 114 are electrical circuit elements with electrically conductive material formed into a coil configuration. Transmission induction coils 114 generally are microelectronic devices and generally are formed in very thin layers on or in a substrate (e.g., layers of less than 100 µm, less than 10 µm, or less than 1 µm thick). Graphene is a very thin, conductive form of carbon that may be formed in layers, typically only a single atom thick. Forming transmission induction coils 114 of graphene may permit thin transmission induction coils 114, thin coil layers 154, and/or thin sensor blades 112, which may facilitate a high density of transmission induction coils 114 and/or use of sensor blade 112 in thin gaps 144 (e.g., an average of less than 10 mm, less than 1 mm, or less than 0.1 mm thick).

The following subject matter of this paragraph characterizes example 23 of the present disclosure, wherein example 23 also includes the subject matter according to any one of examples 1 to 22, above. Referring generally to FIG. 1 and particularly to, e.g., FIGS. 2-6, reception induction coils 116 comprise graphene.

Reception induction coils 116 are electrical circuit elements with electrically conductive material formed into a coil configuration. Reception induction coils 116 generally are microelectronic devices and generally are formed in very thin layers on or in a substrate (e.g., layers of less than 100 µm, less than 10 µm, or less than 1 µm thick). Forming reception induction coils 116 of graphene may permit thin reception induction coils 116, thin coil layers 154, and/or thin sensor blades 112, which may facilitate a high density of reception induction coils 116 and/or use of sensor blade 112 in thin gaps 144.

The following subject matter of this paragraph characterizes example 24 of the present disclosure, wherein example 24 also includes the subject matter according to any one of examples 1 to 23, above. Referring generally to FIG. 1 and particularly to, e.g., FIGS. 2-6, transmission induction coils 114 are spiral planar inductors.

Spiral planar inductors may be formed in thin layers which may facilitate a high density of transmission induction coils 114 and/or use of sensor blade 112 in thin gaps 144. Spiral planar inductors are electrical inductors that have a planar and spiral form. Two examples of spiral planar inductors are schematically shown in FIG. 6. Reception induction coil 116 of FIG. 6 has a typical planar spiral form with an electrical trace spiraling about a common center following a simple geometric form (a rectangular form in the example of FIG. 6; other common forms are circles, ellipses, squares, and convex polygons). Transmission induction coil 114 of FIG. 6 has a planar, concave spiral form in which the electrical trace spirals about a common center following a concave polygonal form. Spiral planar inductors may be referred to as pancake inductors.

The following subject matter of this paragraph characterizes example 25 of the present disclosure, wherein example 25 also includes the subject matter according to any one of examples 1 to 24, above. Referring generally to FIG. 1 and particularly to, e.g., FIGS. 2-6, reception induction coils 116 are spiral planar inductors.

Spiral planar inductors may be formed in thin layers which may facilitate a high density of reception induction coils 116 and/or use of sensor blade 112 in thin gaps 144.

The following subject matter of this paragraph characterizes example 26 of the present disclosure, wherein example 26 also includes the subject matter according to any one of examples 1 to 25, above. Referring generally to FIG. 1 and particularly to, e.g., FIGS. 2-6, sensor blade 112 comprises exterior protection layers 152 that cover transmission induction coils 114 and reception induction coils 116.

As shown in the example of FIG. 5, exterior protection layer 152 isolates transmission induction coils 114 and reception induction coils 116 from mechanical contact, electrical contact, and/or environmental effects. For example, exterior protection layer 152 may be rugged, abrasion resistant, water tight, and/or gas tight. Exterior protection layer 152, like sensor blade 112, may be semi-flexible and/or capable of withstanding flexing that may occur when sensor blade 112 is inserted into gap 144. Exterior protection layer 152 may include, and/or may be, a semi-flexible coating of polyurethane material and/or a scratch-resistant and toughened glass (e.g., GORILLA GLASS brand glass). Sensor blade 112 may comprise exterior protection layer 152 at all environmentally exposed edges and/or surfaces. Generally, exterior protection layer 152 is very thin (e.g., less than 1 mm, less than 0.1 mm, or less than 0.01 mm).

The following subject matter of this paragraph characterizes example 27 of the present disclosure, wherein example 27 also includes the subject matter according to any one of examples 1 to 26, above. Referring generally to FIG. 1 and particularly to, e.g., FIGS. 2-6, each of transmission induction coils 114 has a lateral area of less than 1 square centimeter and greater than 100 square microns.

Small transmission induction coils 114 (having a lateral area of less than 1 square centimeter) permit small measurement sites 118 and/or high resolution measurement of separation distances 134. The lateral area of transmission induction coils 114 is the area of transmission induction coils 114 in blade plane 156 of sensor blade 112.

The following subject matter of this paragraph characterizes example 28 of the present disclosure, wherein example 28 also includes the subject matter according to any one of examples 1 to 27, above. Referring generally to FIG. 1 and particularly to, e.g., FIGS. 2-6, each of reception induction coils 116 has a lateral area of less than 1 square centimeter and greater than 100 square microns.

Small reception induction coils 116 (having a lateral area of less than 1 square centimeter) permit small measurement sites 118 and/or high resolution measurement of separation distances 134. The lateral area of reception induction coils 116 is the area of reception induction coils 116 in blade plane 156 of sensor blade 112.

The following subject matter of this paragraph characterizes example 29 of the present disclosure, wherein example 29 also includes the subject matter according to any one of examples 1 to 28, above. Referring generally to FIG. 1 and particularly to, e.g., FIGS. 2-6, sensor blade 112 has at least 1000 of measurement sites 118 at a density of greater than a single one of measurement sites 118 per square centimeter and less than 1,000,000 of measurement sites 118 per square centimeter.

Electronic feeler gauge 110 may have a high density of measurement sites 118 and/or a large number of measurement sites 118 to provide a high resolution thickness map of gap 144. Sensor blade 112 may have an active surface area (surface area including measurement sites 118) and/or width comparable to typical gaps 144. Hence, sensor blade 112 may have an active surface area of greater than 10 cm$^2$ (square centimeters) or greater than 50 cm$^2$. Sensor blade 112 may have a width of greater than 1 cm, greater than 5 cm, or greater than 20 cm.

The following subject matter of this paragraph characterizes example 30 of the present disclosure, wherein example 30 also includes the subject matter according to any one of examples 1 to 29, above. Referring generally to FIG. 1 and particularly to, e.g., FIGS. 2-6, sensor blade 112 has a thickness that is less than 0.5 mm and greater than 0.001 mm.

Sensor blade 112 may be thin enough to fit within a wide range of gap 144 sizes. Sensor blade 112 may be thin enough to fit into and/or measure gaps 144 that are thin (e.g., as small as 0.5 mm). Sensor blade 112 may be thin enough to fit into and/or measure residual space around shim 170 in gap 144. In the aerospace industry, relative positional tolerances between parts may be less than 0.05 inch (about 1 mm) and therefore gaps 144 and/or residual space may be less than 1 mm.

The following subject matter of this paragraph characterizes example 31 of the present disclosure, wherein example 31 also includes the subject matter according to any one of examples 1 to 30, above. Referring generally to FIG. 1 and particularly to, e.g., FIGS. 2-6, electronic feeler gauge 110 further comprises computing system 160 that is operatively coupled to receiving system 124.

Computing system 160 generally is configured (e.g., programmed) to control transmitting system 120 and/or receiving system 124. Computing system 160 may coordinate generating transmitted probe signals 122 with transmission induction coils 114, receiving response signals 126 with reception induction coils 116, and/or determining separation distances 134.

Computing system 160 may be operatively coupled to transmitting system 120 and/or receiving system 124 by one or more electronic communications links. Computing system 160 may comprise, and/or may be a computer (e.g., comprising a processor and memory) and/or dedicated hardware. Computing system 160 may implement its functions (e.g., controlling generation of transmitted probe signals 122, controlling reception of response signals 126, and/or determining separation distances 134) in software, firmware, and/or hardware.

The following subject matter of this paragraph characterizes example 32 of the present disclosure, wherein example 32 also includes the subject matter according to example 31, above. Referring generally to FIG. 1 and particularly to, e.g., FIGS. 2-6, computing system 160 is configured to generate 3D virtual model 162 of gap 144, probed by sensor blade 112, based upon response signals 126 and measurement sites 118.

3D virtual model 162 represents gap 144 probed by electronic feeler gauge 110 and sensor blade 112 and may be used to analyze gap 144, to select one or more shims 170 to fill gap 144, and/or to create one or more shims 170 to fill gap 144. 3D virtual model 162 may be used to determine the volume, surface area, and/or shape of gap 144. Accurate representation of gap 144 (such as 3D virtual model 162) provides an accurate guide to determine the size and shape of one or more shims 170 to fill gap 144.

Computing system 160 is configured to generate 3D virtual model 162 based upon separation distances 134 determined at measurement sites 118. Computing system 160 may be configured to determine separation distances 134 based upon response signals 126 and/or transmitted probe signals 122. Additionally or alternatively, computing system 160 may receive (e.g., from receiving system 124) separation distances 134 that were determined based upon response signals 126 and/or transmitted probe signals 122. 3D virtual model 162 may be a point cloud, a polygon mesh, and/or a 3D representation (e.g., a surface tessellation, a 3D wireframe, a 3D solid, or a 3D boundary representation).

The following subject matter of this paragraph characterizes example 33 of the present disclosure, wherein example 33 also includes the subject matter according to example 32, above. Referring generally to FIG. 1 and particularly to, e.g., FIGS. 2-6, computing system 160 is configured to identify suitable shims 170 to be inserted into gap 144 by comparing dimensions of candidate shims to 3D virtual model 162 of gap 144.

Computing system 160 may store dimensions of candidate shims and/or may be provided dimensions of candidate shims. The dimensions of candidate shims may be compared to 3D virtual model 162 to identify which one or more of candidate shims would be suitable to fill gap 144. For example, in FIG. 3, three shims 170 are arranged to together fill gap 144.

Computing system 160 may be configured to identify one or more suitable shims 170 from a collection of candidate shims to fill gap 144. Computing system 160 may be configured to identify and optionally rank several individual candidate shims which may each be suitable. Computing system 160 may be configured to identify a group of candidate shims that may be used together to fill gap 144 (hence, the group of candidate shims together are suitable shims 170). Computing system 160 additionally may identify an order and/or pattern for placement of the group of candidate shims within gap 144. Shims 170 may be formed of suitable structural materials such as brass, aluminum, titanium, and composite materials (e.g., fiberglass).

Identification of one or more suitable shims 170 assists installation of shims 170 in gap 144 because a technician does not need to trial fit shims 170 until suitable ones are found. Additionally or alternatively, the orientation, order, and/or placement of suitable shims 170 may be identified by computing system 160 to assist installation of shims 170 in the proper orientation, order, and/or placement.

The following subject matter of this paragraph characterizes example 34 of the present disclosure, wherein example 34 also includes the subject matter according to any one of examples 32 to 33, above. Referring generally to FIG. 1 and particularly to, e.g., FIGS. 2-6, computing system 160 comprises display 164 and is configured to render an image of 3D virtual model 162 of gap 144 with display 164.

Rendering an image of 3D virtual model 162 may assist verification by an operator that gap 144 was measured successfully. Additionally or alternatively, the image of 3D virtual model 162 may be used to identify and/or to verify suitable shims 170 that are to be used to fill gap 144.

Generally, computing system 160 is configured to interactively display 3D virtual model 162 such that an operator may zoom and rotate the view to see different perspectives of 3D virtual model 162. Computing system 160 may be configured to render images of candidate shims and/or suitable shims 170 with display 164 and may be configured to display comparative images (e.g., overlay, side-by-side, etc.). Display 164 is an electronic visual display such as an LED display, an LCD display, etc.

The following subject matter of this paragraph characterizes example 35 of the present disclosure, wherein example 35 also includes the subject matter according to any one of examples 31 to 34, above. Referring generally to FIG. 1 and particularly to, e.g., FIGS. 2-6, computing system 160 is configured to determine separation distances 134 based upon response signals 126. Separation distances 134 are at measurement sites 118 of sensor blade 112 between first surface 140 of first workpiece 136 and second surface 142 of second workpiece 138.

Computing system 160 is configured to determine separation distances 134 based upon response signals 126 and/or transmitted probe signals 122 corresponding to each of measurement sites 118. Response signals 126 are generated according to the presence and/or properties of electromagnetic fields (such as transmitted probe signals 122) at measurement sites 118. Location and composition of materials of first workpiece 136 and second workpiece 138 affect response signals 126 from measurement sites 118 between first surface 140 (of first workpiece 136) and second surface 142 (of second workpiece 138). For each of measurement sites 118, measured response signals 126 may be compared to calibrated values and/or models of response signals to determine separation distances 134.

The following subject matter of this paragraph characterizes example 36 of the present disclosure, wherein example 36 also includes the subject matter according to example 35, above. Referring generally to FIG. 1 and particularly to, e.g., FIGS. 2-6, computing system 160 is configured to identify suitable shims 170 to be inserted into gap 144, probed by sensor blade 112, by comparing dimensions of candidate shims to separation distances 134 at measurement sites 118.

Computing system 160 may store dimensions of candidate shims and/or may be provided dimensions of candidate shims. The dimensions of candidate shims may be compared to separation distances 134 at measurement sites 118 to identify which one or more of candidate shims would be suitable to fill gap 144. Computing system 160 may be configured to identify one or more suitable shims 170 from a collection of candidate shims to fill gap 144. Computing system 160 may be configured to identify and optionally rank several individual candidate shims which may each be suitable. Computing system 160 may be configured to identify a group of candidate shims that may be used together to fill gap 144 (hence, the group of candidate shims together are suitable shims 170). Computing system 160 additionally may identify an order and/or pattern for placement of the group of candidate shims within gap 144.

Identification of one or more suitable shims 170 assists installation of shims 170 in gap 144 because a technician does not need to trial fit shims 170 until suitable ones are found. Additionally or alternatively, the orientation, order, and/or placement of suitable shims 170 may be identified by computing system 160 to assist installation of shims 170 in the proper orientation, order, and/or placement.

The following subject matter of this paragraph characterizes example 37 of the present disclosure, wherein example 37 also includes the subject matter according to any one of examples 35 to 36, above. Referring generally to FIG. 1 and particularly to, e.g., FIGS. 2-6, computing system 160 comprises display 164 and is configured to display an image of separation distances 134 at measurement sites 118 on display 164.

Displaying the image of separation distances 134 may assist verification by an operator that gap 144 was measured successfully. Additionally or alternatively, the image of separation distances 134 may be used to identify and/or to verify suitable shims 170 that are to be used to fill gap 144.

The image of separation distances 134 at measurement sites 118 may be in the form of a graph, a table, a line profile, a surface profile, a polygonal mesh, and/or a volume rendering. For example, the image of separation distances 134 at measurement sites 118 may be a two-dimensional bar graph with each bar representing one of separation distances 134 at one of measurement sites 118 and each bar may be arranged to represent the two-dimensional arrangement of measurement sites 118.

Computing system 160 may be configured to interactively display separation distances 134 such that an operator may zoom and rotate the view to see different perspectives of separation distances 134. Computing system 160 may be configured to render images and/or dimensions of candidate shims and/or suitable shims 170 with display 164 and may be configured to display comparative images (e.g., overlay, side-by-side, etc.).

The following subject matter of this paragraph characterizes example 38 of the present disclosure, wherein example 38 also includes the subject matter according to any one of examples 31 to 37, above. Referring generally to FIG. 1 and particularly to, e.g., FIGS. 2-6, computing system 160 and receiving system 124 are configured to communicate wirelessly.

Wireless communication between computing system 160 and receiving system 124 facilitates remote operation of receiving system 124 and/or modular design of electronic feeler gauge 110. For example, computing system 160 may be physically separate or separable from receiving system 124. Suitable wireless communication protocols and techniques include infrared communication, radio communication, WI-FI brand protocol, and BLUETOOTH brand protocol.

The following subject matter of this paragraph characterizes example 39 of the present disclosure, wherein example 39 also includes the subject matter according to any one of examples 31 to 38, above. Referring generally to FIG. 1 and particularly to, e.g., FIGS. 2-6, sensor blade 112, transmitting system 120, and receiving system 124 are part of handheld probe 172. Computing system 160 is configured to wirelessly supply power to handheld probe 172.

Wireless power transfer between computing system 160 and handheld probe 172 facilitates remote operation of handheld probe 172 and/or modular design of electronic feeler gauge 110. With wireless power transfer, handheld probe 172 may be produced in a smaller package and without power cables as compared to electronic feeler gauge 110 that does not utilize wireless power transfer. Wireless power transfer may be performed by inductive charging (inductively coupled components), by capacitive charging (capacitively coupled components), and/or by radiative charging (e.g., by transfer of beams of radio energy, microwave energy, laser energy, etc.).

Referring generally to FIG. 1 and particularly to, e.g., FIGS. 2-6, electronic feeler gauge 110 is disclosed. Electronic feeler gauge 110 comprises sensor blade 112, transmitting system 120, and receiving system 124. Sensor blade 112 comprises transmission induction coils 114, reception induction coils 116, and measurement sites 118 spaced in two dimensions about sensor blade 112. Each of measurement sites 118 is associated with at least one of transmission induction coils 114 and at least one of reception induction coils 116. Transmitting system 120 is configured to drive modulated signals 130 across transmission induction coils 114 to produce transmitted probe signals 122 from transmission induction coils 114. Receiving system 124 is configured to receive response signals 126 from reception induction coils 116 due to transmitted probe signals 122. The preceding subject matter of this paragraph characterizes example 40 of the present disclosure.

Use of electronic feeler gauge 110 as set forth in example 40 allows for measuring gap 144 between first surface 140 (of first workpiece 136) and second surface 142 (of second workpiece 138) in three dimensions. With sensor blade 112 at least partially within gap 144, measurement sites 118 (spaced in two dimensions about sensor blade 112) are configured to measure separation distances 134 between first surface 140 and second surface 142 at the respective measurement sites 118. Measurement sites 118 generally form a two-dimensional array across sensor blade 112.

The thickness of gap 144 (also called the spacing of gap 144) at each of (two-dimensionally spaced) measurement sites 118 may be measured to provide a thickness map of gap 144 across and along gap 144 (i.e., in the width and depth dimensions of gap 144). The thickness map of separation distances 134 at measurement sites 118 is a three dimensional map of gap 144. The thickness map of gap 144 may be used to create and/or select shims 170 that precisely fill gap 144 and/or that are non-uniform in one or more dimensions. Additionally or alternatively, the thickness map of gap 144 may be used to verify proper alignment and/or fit of mated components. Precise alignment and/or fit of components of an aerospace structure (with or without shims) facilitate reliable and efficient construction of the structure and reliable operation of the structure.

Measurement sites 118 are each associated with at least one of transmission induction coils 114 and at least one of reception induction coils 116. Typically, each measurement site 118 is associated with one of transmission induction coils 114 and one of reception induction coils 116. Each of the associated transmission induction coils 114 is configured to produce one of transmitted probe signals 122 at the associated measurement site 118. Each of the associated reception induction coils 116 is configured to receive one of response signals 126 at the associated measurement site 118.

Sensor blade 112 may be a rigid or a semi-flexible structure that comprises transmission induction coils 114 and reception induction coils 116. A rigid sensor blade 112 may be useful to fit into small gaps 144, to fit at an identified angle within gaps 144, and/or to resist buckling and/or folding within gaps 144. A semi-flexible sensor blade 112 may be useful to conform to gaps 144 and/or to fit into convoluted gaps 144. Semi-flexible sensor blade 112 may be rigid enough to avoid buckling and/or folding within gaps 144, and/or flexible enough to conform to concave and/or convex surfaces within gaps 144. Sensor blade 112 may have the form of a thin strip, sheet, and/or membrane. As shown in FIG. 2, sensor blade 112 has blade plane 156 and blade thickness 158.

Transmitting system 120, transmission induction coils 114, receiving system 124, and reception induction coils 116 are configured to probe and to sense gap 144, first surface 140, and/or second surface 142 by electrical induction. Hence, transmission induction coils 114 and reception induction coils 116 are induction coils each with a characteristic inductance.

Use of electrical induction to determine separation distances 134 permits non-contact sensing of the dimensions of gap 144. For example, sensor blade 112 is not required to contact either of first surface 140 or second surface 142 during measurement of gap 144. Use of electrical induction to determine separation distances 134 may be more robust to the presence of electrical noise, environmental effects, and/or surface contamination relative to other electrical sensing techniques (such as sensing electrical capacitance). Use of electrical induction to determine separation distances 134 may be more robust to surface finish variations and surface contamination relative to optical sensing techniques.

Transmission induction coils 114 are configured to transmit transmitted probe signals 122 according to modulated signals 130 that may be driven across transmission induction coils 114 by transmitting system 120. Modulated signals 130 are alternating electrical current signals (AC signals) that have characteristic time structures, such as frequency, waveform, amplitude, modulation, and/or phase. Modulated signals 130 may be turned on or off, and the characteristics of modulated signals may be adjusted (e.g., between applications of modulated signals 130 and/or between measurement sites 118). Transmitted probe signals 122 are electromagnetic induction fields (AC magnetic fields) that extend beyond sensor blade 112.

Interaction of transmitted probe signals 122 and the material or materials of first surface 140 and/or second surface 142 changes one or more properties of transmitted probe signals 122 (relative to no interaction). The interaction may cause intensification, attenuation, and/or displacement of transmitted probe signals 122 according to location and/or properties of the material(s), such as electrical conductivity and magnetic susceptibility.

Reception induction coils 116 are configured to receive response signals 126 according to the interaction of transmitted probe signals 122 and the material(s) of first surface 140 and/or second surface 142. Reception induction coils 116 are sensitive to electromagnetic fields and sense the electromagnetic fields by induction. Reception induction coils 116 may produce an electrical current and/or an electrical voltage in the presence of electromagnetic fields, in response to electromagnetic fields turning on or off, in response to time-varying properties of electromagnetic fields (e.g., oscillating fields), in response to movement of the electromagnetic fields, in response to movement of materials within the electromagnetic fields, and/or in response to movement of sensor blade 112 relative to gap 144.

Comparison of transmitted probe signals 122 to response signals 126 may be utilized to determine the presence or absence of materials (e.g., at first surface 140 and/or at second surface 142) and/or the distance between materials (e.g., separation distance 134 between first surface 140 and second surface 142). Generally, the measurements of separation distances 134 are measurements at measurement sites 118 based upon response signals 126 and/or comparisons of response signals 126 to transmitted probe signals 122 at measurement sites 118.

Transmitted probe signals 122 and measured gap distances (thicknesses) generally are between first surface 140 and second surface 142. In some examples, transmitted probe signals 122 and/or measured gap distances may be between sensor blade 112 and first surface 140, and/or between sensor blade 112 and second surface 142. For example, electronic feeler gauge 110 and/or sensor blade 112 may be configured to measure gap distances between sensor blade 112 and first surface 140, and configured to contact second surface 142 with sensor blade 112. In such a configuration, separation distances 134 are the measured gap distances plus blade thickness 158 of sensor blade 112. As another example, electronic feeler gauge 110 and/or sensor blade 112 may be configured to independently measure gap distances between sensor blade 112 and first surface 140 (a first gap distance), and between sensor blade 112 and second surface 142 (a second gap distance). In such a configuration, separation distances 134 are the measured (first and second) gap distances plus blade thickness 158 of sensor blade 112.

Transmission induction coils 114, reception induction coils 116, and/or measurement sites 118 may be associated with one or both of first surface 140 and second surface 142.

The following subject matter of this paragraph characterizes example 41 of the present disclosure, wherein example 41 also includes the subject matter according to example 40, above. Referring generally to FIG. 1 and particularly to, e.g., FIGS. 2-6, transmitting system 120 comprises signal generator 184, configured to produce modulated signals 130.

Signal generator 184 produces modulated signals 130 (AC electrical signals) for each of transmission induction coils 114 to produce transmitted probe signals 122. Signal generator 184 may include an oscillator and/or a waveform generator to provide an AC voltage and/or current signal. Signal generator 184 is configured to produce modulated signals 130 with characteristic temporal attributes such as frequency, waveform, amplitude, modulation, and/or phase. Signal generator 184 may be configured to control, to regulate, and/or to vary temporal attributes of modulated signals 130. Signal generator 184 may be configured to deliver modulated signals 130 to each of transmission induction coils 114 and may be configured to deliver modulated signals 130 to one or more of transmission induction coils 114 simultaneously. Generally, signal generator 184 is connected with a low impedance electrical path to transmission induction coils 114. Low impedance (e.g., a magnitude of less than 100 ohm) at the frequency or frequencies of modulated signals 130 facilitates efficient electrical transmission of modulated signals 130.

Signal generator 184 may be configured to generate modulated signals 130 with (and modulated signals 130 may have) a frequency suitable to generate transmitted probe signals 122 (modulated electromagnetic radiation) that interact with the materials of first surface 140 and second surface 142 of gap 144. Lower frequencies of modulated electromagnetic radiation (e.g., less than 100 kHz (kilohertz), less than 1 kHz, or less than 0.1 kHz) may penetrate deeper into first workpiece 136 and second workpiece 138. Higher frequencies (e.g., microwave frequencies or radio frequencies (RF) such as greater than 0.1 MHz (megahertz), greater than 10 MHz, or greater than 1,000 MHz) may emphasize surface interactions of first workpiece 136 and second workpiece 138. Generally, frequencies are greater than 1 Hz (hertz) and less than 1,000 GHz (gigahertz).

The following subject matter of this paragraph characterizes example 42 of the present disclosure, wherein example 42 also includes the subject matter according to any one of examples 40 to 41, above. Referring generally to FIG. 1 and particularly to, e.g., FIGS. 2-6, transmitting system 120 is configured to multiplex transmitted probe signals 122 by frequency-division multiplexing.

Transmitting system 120 and/or de-multiplexer 180 may be configured to deliver modulated signals 130 to transmission induction coils 114 to generate transmitted probe signals 122 via frequency-division multiplexing. Hence, at least one of modulated signals 130 may have a frequency that is different than at least one other of modulated signals 130. Likewise, at least one of transmitted probe signals 122 may have a frequency that is different than at least one other of transmitted probe signals 122. Additionally or alternatively, transmission induction coils 114 may be responsive to selected frequencies and/or different transmission induction coils 114 may be responsive to different frequencies. For example, transmission induction coils 114 may be resonant and/or different transmission induction coils 114 may have different resonant frequency peaks.

Modulated signals 130 (and transmitted probe signals 122) with different frequencies may be simultaneously delivered to (generated by) transmission induction coils 114 without significant cross talk between modulated signals 130 (and transmitted probe signals 122) at different measurement sites 118.

Frequency-division multiplexing is a multiplexing scheme in which the single input (or output) signal is connected to multiple output (or input) signals that are simultaneously active and each has a different frequency. Specifically, the single input (or output) signal (e.g., an electrical current amplitude) is modulated (or demodulated) with a different frequency for each one of a group of output (or input) signals. A typical frequency-division multiplexing process transmits the single input signal to each one of the output signals modulated at a range of non-overlapping frequencies so that each one of the output signals has a different frequency. In the reverse, a typical frequency-division multiplexing process simultaneously receives each one of the multiple input signals at a different frequency, demodulates each of the input signals and produces an output that is a combination of the inputs. The output may be time-division multiplexed (i.e., each demodulated input signal may be sequentially transmitted in the output signal), parallel (i.e., each demodulated input signal may be transmitted in the output via a different physical channel), or mixed (e.g., the demodulated input signals are analog or digitally mixed to produce the output signal).

The following subject matter of this paragraph characterizes example 43 of the present disclosure, wherein example 43 also includes the subject matter according to any one of examples 40 to 42, above. Referring generally to FIG. 1 and particularly to, e.g., FIGS. 2-6, receiving system 124 is configured to multiplex response signals 126 by frequency-division multiplexing.

Receiving system 124 and/or multiplexer 190 may be configured to receive response signals 126 from two or more reception induction coils 116 simultaneously via frequency-division multiplexing. Hence, at least one of response signals 126 may have a frequency that is different than at least one other of response signals 126. Additionally or alternatively, reception induction coils 116 may be responsive to selected frequencies and/or different reception induction coils 116 may be responsive to different frequencies. For example, reception induction coils 116 may be resonant and/or different reception induction coils 116 may have different resonant frequency peaks.

Reception of response signals 126 with different frequencies may reduce cross talk between different measurement sites 118 and/or reception induction coils 116.

The following subject matter of this paragraph characterizes example 44 of the present disclosure, wherein example 44 also includes the subject matter according to any one of examples 40 to 43, above. Referring generally to FIG. 1 and particularly to, e.g., FIGS. 2-6, transmitted probe signals 122 are static alternating electromagnetic fields.

Transmitted probe signals 122 may be static (i.e., steady-state) alternating electromagnetic induction fields (static, AC magnetic fields). Though transmitted probe signals 122 each have a frequency and are time varying, the frequency is sufficiently high to separate average properties of transmitted probe signals 122 from modulation frequency properties. For example, transmitted probe signals 122 may each independently have an amplitude that is substantially constant while the respective transmitted probe signal 122 is active. As another example, transmitted probe signals 122 may each independently have a modulation (a relative amplitude at a frequency as compared to an average amplitude) that is substantially constant while the respective transmitted probe signal 122 is active. Having static (i.e., steady state) properties facilitates detection of effects on transmitted probe signals 122 due to first surface 140, second surface 142, first workpiece 136, and/or second workpiece 138 at gap 144.

The following subject matter of this paragraph characterizes example 45 of the present disclosure, wherein example 45 also includes the subject matter according to any one of examples 40 to 44, above. Referring generally to FIG. 1 and particularly to, e.g., FIGS. 2-6, transmitted probe signals 122 are RF signals.

Transmitted probe signals 122 and/or modulated signals 130 may have a frequency in the radio frequency spectrum, i.e., greater than 3 kHz and less than 30 GHz. Relatively high frequencies such as those of RF signals may emphasize surface interactions of first workpiece 136 and second workpiece 138 at gap 144.

The following subject matter of this paragraph characterizes example 46 of the present disclosure, wherein example 46 also includes the subject matter according to any one of examples 40 to 45, above. Referring generally to FIG. 1 and particularly to, e.g., FIGS. 2-6, transmitted probe signals 122 have a frequency that is greater than 10 kHz and less than 10 GHz.

Transmitted probe signals 122 and/or modulated signals 130 with a frequency in the range between 10 kHz and 10 GHz may be commercially convenient and/or allocated for industrial and scientific uses by convention, national laws, and/or international treaties.

The following subject matter of this paragraph characterizes example 47 of the present disclosure, wherein example 47 also includes the subject matter according to any one of examples 40 to 46, above. Referring generally to FIG. 1 and particularly to, e.g., FIGS. 2-6, sensor blade 112 has blade plane 156 and blade thickness 158, perpendicular to blade plane 156. Transmission induction coils 114 are configured to generate a static alternating electromagnetic field outside of blade plane 156 to probe materials placed external to sensor blade 112 within a predefined distance, perpendicular to blade plane 156. The predefined distance is less than twenty times blade thickness 158.

Transmitted probe signals 122 and/or modulated signals 130 may be static (i.e., steady-state) alternating electromagnetic induction fields (static, AC magnetic fields). Alternating electromagnetic fields permeate beyond transmission induction coils 114 into the space near sensor blade 112, measurement site 118, and transmission induction coil 114 associated with each alternating electromagnetic field. Alternating electromagnetic fields are distorted by and interact with metal, metallic materials, magnetic materials, magnetically permeable materials, and electrically conductive materials. Hence, transmitted probe signals 122 may be affected by the presence, type, and/or arrangement of first surface 140 and/or second surface 142 that include any such materials.

Generally, static alternating electromagnetic fields generated by transmission induction coils 114 have a static field strength (amplitude) that decreases in relation to an inverse power of the distance from transmission induction coils 114. The static source strength and source-distance relation of each of the static alternating electromagnetic fields depends on the amplitude of modulated signals 130 and the configuration of transmission induction coil 114 that produce the static alternating electromagnetic field. The distance from transmission induction coils 114 at which the amplitude of the static alternating electromagnetic fields has a predetermined value (e.g., an amplitude corresponding to a minimum detectable value at reception induction coils 116) may be a characteristic sensing distance of sensor blade 112. The characteristic sensing distance may be at least 1 mm, at least 5 mm, at least 10 mm, and/or less than 100 mm. Thus, electronic feeler gauge 110 and sensor blade 112 may be configured to measure separation distances 134 of gaps 144 that are at least 1 mm, at least 5 mm, at least 10 mm, and/or less than 100 mm.

The following subject matter of this paragraph characterizes example 48 of the present disclosure, wherein example 48 also includes the subject matter according to any one of examples 40 to 47, above. Referring generally to FIG. 1 and particularly to, e.g., FIGS. 2-6, transmission induction coils 114 are RF transmission antennas 186.

Transmission induction coils 114 may be RF transmission antennas 186 that are configured to respond to modulated signals 130 and/or to produce transmitted probe signals 122 that have a frequency in the radio frequency spectrum. RF transmission antennas 186 may efficiently produce RF signals and facilitate efficient electrical design and use of RF signals. RF transmission antennas 186 may have a transmission frequency range and/or a peak transmission frequency (in the radio frequency spectrum). RF transmission antennas 186 may be tuned to transmit at one or more frequencies (in the radio frequency spectrum).

The following subject matter of this paragraph characterizes example 49 of the present disclosure, wherein example 49 also includes the subject matter according to example 48, above. Referring generally to FIG. 1 and particularly to, e.g., FIGS. 2-6, all of RF transmission antennas 186 are tuned to transmit at a common frequency.

RF transmission antennas 186 may each be tuned to transmit at a common frequency and/or within a range of common frequencies. Having all RF transmission antennas 186 transmit at the same frequency may facilitate electronics design and/or efficiency of the electronics (such as transmitting system 120). Having all RF transmission antennas 186 transmit at the same frequency may facilitate use of electronic feeler gauge 110 and/or sensor blade 112 at a common frequency. The common frequency may be selected to probe selected surface characteristics of gap 144 and/or to probe a selected surface depth within gap 144.

The following subject matter of this paragraph characterizes example 50 of the present disclosure, wherein example 50 also includes the subject matter according to example 49, above. Referring generally to FIG. 1 and particularly to, e.g., FIGS. 2-6, transmitting system 120 comprises signal generator 184 that is configured to produce modulated signals 130 at the common frequency.

Signal generator 184 may be configured to produce modulated signals 130 at the common frequency such that transmitted probe signals 122 all have the common frequency. Thus, signal generator 184 may be configured to facilitate generation of transmitted probe signals 122 at the common frequency.

The following subject matter of this paragraph characterizes example 51 of the present disclosure, wherein example 51 also includes the subject matter according to example 48, above. Referring generally to FIG. 1 and particularly to, e.g., FIGS. 2-6, at least one of RF transmission antennas 186 is tuned to transmit at a frequency different than that of at least another one of RF transmission antennas 186.

RF transmission antennas 186 may be tuned to transmit at different frequencies to reduce cross talk between modulated signals 130 and/or transmitted probe signals 122 when different frequencies are used for different measurement sites 118.

The following subject matter of this paragraph characterizes example 52 of the present disclosure, wherein example 52 also includes the subject matter according to example 51, above. Referring generally to FIG. 1 and particularly to, e.g., FIGS. 2-6, all of RF transmission antennas 186 are tuned to transmit at frequencies different from each other.

Having all of RF transmission antennas 186 transmit at different frequencies may reduce cross talk between all measurement sites 118, transmitted probe signals 122, and/or modulated signals 130.

The following subject matter of this paragraph characterizes example 53 of the present disclosure, wherein example 53 also includes the subject matter according to any one of examples 51 to 52, above. Referring generally to FIG. 1 and particularly to, e.g., FIGS. 2-6, transmitting system 120 comprises signal generator 184 that is configured to produce modulated signals 130 at a band of frequencies. The different frequencies are within the band of frequencies.

Signal generator 184 may be configured to produce modulated signals 130 at any of the frequencies used for transmission induction coils 114 such that modulated signals 130 at different frequencies may drive transmission induction coils 114 to generate transmitted probe signals 122 at different frequencies.

The following subject matter of this paragraph characterizes example 54 of the present disclosure, wherein example 54 also includes the subject matter according to any one of examples 48 to 53, above. Referring generally to FIG. 1 and particularly to, e.g., FIGS. 2-6, reception induction coils 116 are RF reception antennas 188.

Reception induction coils 116 may be RF reception antennas 188 that are configured to respond to transmitted probe signals 122 that have a frequency in the radio frequency spectrum. RF reception antennas 188 may efficiently receive RF signals, facilitate efficient electrical design, and facilitate use of RF signals. RF reception antennas 188 may have a reception frequency range and/or a peak reception frequency (in the radio frequency spectrum). RF reception antennas 188 may be tuned to receive at one or more frequencies (in the radio frequency spectrum). RF reception antennas 188 may be configured to receive signals generated by corresponding RF transmission antennas 186 at respective measurement sites 118.

The following subject matter of this paragraph characterizes example 55 of the present disclosure, wherein example 55 also includes the subject matter according to example 54, above. Referring generally to FIG. 1 and particularly to, e.g., FIGS. 2-6, each of RF transmission antennas 186 is tuned to transmit at a respective frequency. Each of RF reception antennas 188 is associated with a respective one of RF transmission antennas 186 and is tuned to receive the respective frequency of the respective one of RF transmission antennas 186.

RF transmission antennas 186 and RF reception antennas 188 may be paired at measurement sites 118, with RF reception antennas 188 tuned to receive signals originating from corresponding RF transmission antennas 186. This configuration may facilitate efficient reception of transmitted probe signals 122 (as modified by the presence of materials at gap 144) and/or may limit cross talk between measurement sites 118.

The following subject matter of this paragraph characterizes example 56 of the present disclosure, wherein example 56 also includes the subject matter according to any one of examples 54 to 55, above. Referring generally to FIG. 1 and particularly to, e.g., FIGS. 2-6, each of RF transmission antennas 186 is tuned to transmit at a respective frequency. Each of RF reception antennas 188 is associated with a respective one of RF transmission antennas 186. Receiving system 124 is tuned to receive, for each of RF reception antennas 188, the respective frequency of the respective one of RF transmission antennas 186.

Receiving system 124 may be tuned to receive signals originating from RF transmission antennas 186 (in addition or alternate to RF reception antennas 188 being tuned to receive signals from corresponding RF transmission antennas 186, e.g., as described in example 56). Receiving system 124 may be configured to coordinate which frequency is received according to which of RF reception antennas 188 are active (with response signals 126 being received). Tuning receiving system 124 may facilitate efficient reception of response signals 126 and/or may limit cross talk between measurement sites 118.

The following subject matter of this paragraph characterizes example 57 of the present disclosure, wherein example 57 also includes the subject matter according to any one of examples 40 to 47, above. Referring generally to FIG. 1 and particularly to, e.g., FIGS. 2-6, reception induction coils 116 are RF reception antennas 188.

Reception induction coils 116 may be RF reception antennas 188 regardless of whether transmission induction coils 114 are RF transmission antennas 186 (e.g., example 48). RF reception antennas 188 may be configured to receive signals generated by corresponding transmission induction coils 114 at respective measurement sites 118. RF reception antennas 188 may efficiently receive RF signals, facilitate efficient electrical design, and facilitate use of RF signals.

The following subject matter of this paragraph characterizes example 58 of the present disclosure, wherein example 58 also includes the subject matter according to any one of examples 40 to 57, above. Referring generally to FIG. 1 and particularly to, e.g., FIGS. 2-6, transmitted probe signals 122 comprise a carrier wave with a carrier frequency. Response signals 126 comprise a primary signal at the carrier frequency. Receiving system 124 is configured to determine at least one of a relative amplitude, a relative modulation, and a phase shift of the primary signal relative to the carrier wave.

Transmitted probe signals 122 may include and/or may be a carrier wave (a signal with a definite waveform and frequency). The frequency of transmitted probe signals 122 may be referred to as the carrier frequency. Transmitted probe signals 122 interact with materials at gap 144, the interactions generally causing an amplitude change, a modulation change, and a phase shift but not a frequency change. Modulation of an AC wave (e.g., the carrier wave, an RF signal, etc.) is a relative amplitude of a frequency component of the AC wave, relative to the average amplitude of the AC wave (also referred to as the DC intensity). By determining an amplitude, a modulation, and/or a phase shift of the primary signals of response signals 126, the interaction of the materials at gap 144 and/or separation distances 134 may be determined.

The following subject matter of this paragraph characterizes example 59 of the present disclosure, wherein example 59 also includes the subject matter according to any one of examples 40 to 58, above. Referring generally to FIG. 1 and particularly to, e.g., FIGS. 2-6, receiving system 124 is configured to generate separation distance signals 132 based upon response signals 126. Separation distance signals 132 are related to separation distances 134 at measurement sites 118 of sensor blade 112 between first surface 140 of first workpiece 136 and second surface 142 of second workpiece 138.

Electronic feeler gauge 110 may be used to measure gaps 144 between similar or dissimilar components such as first workpiece 136 and second workpiece 138. The materials of first workpiece 136 and second workpiece 138, and/or that form first surface 140 and second surface 142 of gap 144, may each independently be metal, metallic, conductive, magnetic, polymeric, and/or composite materials. The materials are not required to be electrically or magnetically conductive. Electronic feeler gauge 110 may be calibrated for different types of materials to produce reliable separation distance measurements regardless of the materials of first workpiece 136, of second workpiece 138, at first surface 140, and/or at second surface 142. Electronic feeler gauge 110 may be calibrated by inserting sensor blade 112 into a calibration gap of known size (thickness, and generally width and depth) and between known materials. The calibration gap may be formed in a calibration artifact (which also may be called a calibration tool). Calibration may include adjusting direct electrical current 128 supplied across transmission induction coils 114 and/or response signals 126 received by receiving system 124, as discussed further herein.

The following subject matter of this paragraph characterizes example 60 of the present disclosure, wherein example 60 also includes the subject matter according to example 59, above. Referring generally to FIG. 1 and particularly to, e.g., FIGS. 2-6, receiving system 124 is configured to receive response signals 126 when at least one of measurement sites 118 is within gap 144, defined by first surface 140 and second surface 142.

Sensor blade 112 may not entirely fit within gap 144 and/or may not be inserted entirely into gap 144. Measurement sites 118 within gap 144 may be used to measure separation distances 134 within gap 144. Measurement sites 118 outside of gap 144 may measure essentially no gap, an infinite separation distance, or a no signal condition. Receiving system 124 and/or electronic feeler gauge 110 may be configured to determine which measurement sites 118 are within gap 144 and which measurement sites 118 are outside of gap 144. Determining which measurement sites 118 are in and/or out of gap 144 may provide a measure and/or estimate of the depth of gap 144 and/or the cross sectional area of gap 144 (e.g., by providing the depth and/or area of sensor blade 112 within gap 144). Receiving system 124 and/or electronic feeler gauge 110 may be configured to measure separation distances 134 only if one or more of measurement sites 118 are within gap 144.

The following subject matter of this paragraph characterizes example 61 of the present disclosure, wherein example 61 also includes the subject matter according to any one of examples 40 to 60, above. Referring generally to FIG. 1 and particularly to, e.g., FIGS. 2-6, wherein each of transmission induction coils 114 is individually electrically addressed by transmitting system 120.

Individually addressing transmission induction coils 114 permits operating one or more transmission induction coils 114 independently and/or at different times. Individual operation may include independently turning on, turning off, using different direct electrical current 128, and/or adjusting direct electrical current 128 for one or more (optionally all) of transmission induction coils 114. Transmission induction coils 114 may be operated (and/or electrically addressed) in groups such as rows, columns, and/or regions. Groups may be sparse, e.g., every fourth element, and/or may be irregular, e.g., a region within which an average of one out of every four elements is controlled together.

Individual operation of one or more (optionally each) of transmission induction coils 114 facilitates probing gap 144 with little to no cross talk between different transmission induction coils 114 and/or measurement sites 118. Individual operation of one or more (optionally each) of transmission induction coils 114 facilitates independently adjusting the magnetic induction field produced by the independently controlled transmission induction coils 114. For example, direct electrical current 128 for each of transmission induction coils 114 may be adjusted such that each of transmission induction coils 114 produces a magnetic induction field of the same strength.

The following subject matter of this paragraph characterizes example 62 of the present disclosure, wherein example 62 also includes the subject matter according to any one of examples 40 to 61, above. Referring generally to FIG. 1 and particularly to, e.g., FIGS. 2-6, transmitting system 120 comprises de-multiplexer 180 to produce one of transmitted probe signals 122 at a different time than another one of transmitted probe signals 122.

De-multiplexer 180 of transmitting system 120 routes direct electrical current 128 from transmitting system 120 to at least one of transmission induction coils 114 to produce respective transmitted probe signals 122. Generally, de-multiplexer 180 of transmitting system 120 routes a single input signal (e.g., direct electrical current 128) to any one of multiple output destinations (e.g., one of transmission induction coils 114). Using de-multiplexer 180 facilitates efficient electrical design and facilitates the use of a single source (e.g., current source 182) to provide direct electrical current 128 to each of transmission induction coils 114.

Transmitting system 120 and/or de-multiplexer 180 may be configured to route direct electrical current 128 to different transmission induction coils 114 at different times. Thus, electronic feeler gauge 110 may be configured to produce different ones of transmitted probe signals 122 at different times. For example, each of transmission induction coils 114 may be sequentially delivered direct electrical current 128 to produce transmitted probe signals 122 at sequential measurement sites 118. Production of transmitted probe signals 122 at some measurement sites 118 while other measurement sites 118 have no transmitted probe signals 122 may reduce cross talk between different measurement sites 118 and/or transmission induction coils 114. De-multiplexer 180 may be configured to switch which of transmission induction coils 114 receive direct electrical current 128 while direct electrical current 128 is held steady (e.g., current source 182 produces a substantially constant direct electrical current 128).

The following subject matter of this paragraph characterizes example 63 of the present disclosure, wherein example 63 also includes the subject matter according to any one of examples 40 to 62, above. Referring generally to FIG. 1 and particularly to, e.g., FIGS. 2-6, transmitting system 120 is configured to multiplex transmitted probe signals 122 by time-division multiplexing.

Transmitting system 120 and/or de-multiplexer 180 may be configured to deliver direct electrical current 128 to transmission induction coils 114 to produce transmitted probe signals 122 one (or a group) at a time via time-division multiplexing. Hence, fewer than all (e.g., one) of transmission induction coils 114 will produce transmitted probe signals 122 at the same time. Production of transmitted probe signals 122 at different times may reduce cross talk between different measurement sites 118 and/or transmission induction coils 114.

The following subject matter of this paragraph characterizes example 64 of the present disclosure, wherein example 64 also includes the subject matter according to any one of examples 40 to 63, above. Referring generally to FIG. 1 and particularly to, e.g., FIGS. 2-6, receiving system 124 is configured to receive at least one of response signals 126 for each of reception induction coils 116.

Each of reception induction coils 116 may respond to magnetic induction fields (from transmitted probe signals 122 interacting with materials at gap 144) at respective measurement sites 118. Receiving system 124 may receive individual response signals 126 for each of reception induction coils 116 corresponding to measurement sites 118. Receiving at least one of response signals 126 for each of reception induction coils 116 facilitates determination of the interaction of the magnetic induction field at each of measurement sites 118 independently.

The following subject matter of this paragraph characterizes example 65 of the present disclosure, wherein example 65 also includes the subject matter according to any one of examples 40 to 64, above. Referring generally to FIG. 1 and particularly to, e.g., FIGS. 2-6, each of reception induction coils 116 is individually electrically addressed by receiving system 124.

Individually addressing reception induction coils 116 permits receiving one or more response signals 126 independently and/or at different times. Reception induction coils 116 may be utilized in groups such as rows, columns, and/or regions that correspond to active transmission induction coils 114 (i.e., transmission induction coils 114 that are producing transmitted probe signals 122). Additionally or alternatively, reception induction coils 116 may be individually electrically addressed to sample one or more of transmitted probe signals 122 at different ones of measurement sites 118 (e.g., sequentially or serially).

Individual utilization of one or more (optionally each) of reception induction coils 116 facilitates probing gap 144 with little to no cross talk between different transmission induction coils 114, reception induction coils 116, and/or measurement sites 118. For example, for each of measurement sites 118, associated transmission induction coil 114 may produce respective transmitted probe signal 122 at that measurement site 118 while neighboring transmission induction coils 114 are disabled (not being operated to produce transmitted probe signals 122). Associated reception induction coil 116 of that measurement site 118 (and/or neighboring reception induction coils 116 of neighboring measurement sites 118) may be utilized to receive respective transmitted probe signal 122 from the one of transmission induction coils 114 that is being operated without significant interference from other transmitted probe signals 122.

The following subject matter of this paragraph characterizes example 66 of the present disclosure, wherein example 66 also includes the subject matter according to any one of examples 40 to 65, above. Referring generally to FIG. 1 and particularly to, e.g., FIGS. 2-6, receiving system 124 comprises multiplexer 190 to receive one of response signals 126 at a different time than another one of response signals 126.

Multiplexer 190 of receiving system 124 routes response signals 126 from at least one of reception induction coils 116 to be measured within receiving system 124. Generally, multiplexer 190 of receiving system 124 routes any one of multiple input signals (e.g., any one of response signals 126 from respective reception induction coil 116) to a single output signal, which then may be further processed (e.g., by analog to digital conversion). Using multiplexer 190 facilitates efficient electrical design and facilitates the use of a single set of detection electronics to detect respective response signals 126 from all of reception induction coils 116.

Receiving system 124 and/or multiplexer 190 may be configured to route response signals 126 from different reception induction coils 116 at different times. Thus, electronic feeler gauge 110 may be configured to receive different ones of response signals 126 at different times. For example, each of reception induction coils 116 may be sequentially connected to receiving system 124 via multiplexer 190 to receive sequential response signals 126 from sequential measurement sites 118. Reception of response signals 126 from some measurement sites 118 while other measurement sites 118 deliver no response signals 126 may reduce cross talk between different measurement sites 118 and/or reception induction coils 116.

The following subject matter of this paragraph characterizes example 67 of the present disclosure, wherein example 67 also includes the subject matter according to any one of examples 40 to 66, above. Referring generally to FIG. 1 and particularly to, e.g., FIGS. 2-6, receiving system 124 is configured to multiplex response signals 126 by time-division multiplexing.

Receiving system 124 and/or multiplexer 190 may be configured to receive response signals 126 from reception induction coils 116 one (or a group) at a time via time-division multiplexing. Hence, fewer than all (e.g., one) of reception induction coils 116 will deliver response signals 126 at the same time. Reception of response signals 126 at different times may reduce cross talk between different measurement sites 118 and/or reception induction coils 116.

The following subject matter of this paragraph characterizes example 68 of the present disclosure, wherein example 68 also includes the subject matter according to any one of examples 40 to 67, above. Referring generally to FIG. 1 and particularly to, e.g., FIGS. 2-6, transmission induction coils 114 are equal in number to reception induction coils 116.

Generally, transmission induction coils 114 have a one-to-one relationship with reception induction coils 116. Each of measurement sites 118 may have one of transmission induction coils 114 and one of reception induction coils 116 at that measurement site 118. Each of reception induction coils 116 may be arranged and/or positioned to sense magnetic induction fields produced by one of transmission induction coils 114. Hence, each of measurement sites 118 may have a single one of transmission induction coils 114 and a single one of reception induction coils 116. Transmission induction coils 114 and reception induction coils 116 that are paired and/or configured to work in tandem may simplify the transmission and reception electronics (e.g., within transmitting system 120 and receiving system 124) and determination of separation distances 134 (by primarily comparing response signals 126 to transmitted probe signals 122 for the paired and/or tandem transmission induction coils 114 and reception induction coils 116).

The following subject matter of this paragraph characterizes example 69 of the present disclosure, wherein example 69 also includes the subject matter according to any one of examples 40 to 68, above. Referring generally to FIG. 1 and particularly to, e.g., FIGS. 2-6, reception induction coils 116 are interspersed among transmission induction coils 114 in sensor blade 112.

Transmission induction coils 114 may be spaced about sensor blade 112 to probe spaced-apart measurement sites 118 within gap 144. Reception induction coils 116 generally are proximate associated transmission induction coils 114 at measurement sites 118. Reception induction coils 116 may be co-located with transmission induction coils 114 in space not occupied by transmission induction coils 114, and, thus, may be interspersed among transmission induction coils 114. Co-locating and/or interspersing transmission induction coils 114 and reception induction coils 116 provides for more compact measurement sites 118 and/or a more compact sensor blade 112 (e.g., in area of blade plane 156, in blade thickness 158, and/or in volume of sensor blade 112). More compact measurement sites 118 permit a higher density of measurement sites 118 in sensor blade 112 and, hence, a higher resolution determination of separation distances 134 within gap 144.

The following subject matter of this paragraph characterizes example 70 of the present disclosure, wherein example 70 also includes the subject matter according to any one of examples 40 to 69, above. Referring generally to FIG. 1 and particularly to, e.g., FIGS. 2-6, reception induction coils 116 are interdigitated with transmission induction coils 114 in sensor blade 112.

Reception induction coils 116 and transmission induction coils 114 may be interdigitated in sensor blade 112, e.g., as shown in the example of FIG. 6. Interdigitated reception induction coils 116 and transmission induction coils 114 provide for more compact measurement sites 118 and/or a more compact sensor blade 112 (e.g., in area of blade plane 156, in blade thickness 158, and/or in volume of sensor blade 112). More compact measurement sites 118 permit a higher density of measurement sites 118 in sensor blade 112 and, hence, a higher resolution determination of separation distances 134 within gap 144.

The following subject matter of this paragraph characterizes example 71 of the present disclosure, wherein example 71 also includes the subject matter according to any one of examples 40 to 70, above. Referring generally to FIG. 1 and particularly to, e.g., FIGS. 2-6, at least one of reception induction coils 116 overlaps with at least one of transmission induction coils 114 in sensor blade 112.

Some or all of reception induction coils 116 may overlap with some or all of transmission induction coils 114. Overlapping reception induction coils 116 and transmission induction coils 114 provide for more compact measurement sites 118 and/or a more compact sensor blade 112 (e.g., in area of blade plane 156, in blade thickness 158, and/or in volume of sensor blade 112). More compact measurement sites 118 permit a higher density of measurement sites 118 in sensor blade 112 and, hence, a higher resolution determination of separation distances 134 within gap 144.

The following subject matter of this paragraph characterizes example 72 of the present disclosure, wherein example 72 also includes the subject matter according to example 71, above. Referring generally to FIG. 1 and particularly to, e.g., FIGS. 2-6, each of reception induction coils 116 overlaps with at least one of transmission induction coils 114 in sensor blade 112.

All of reception induction coils 116 may overlap corresponding transmission induction coils 114. Having all reception induction coils 116 each overlap with at least one of transmission induction coils 114 provides for all of measurement sites 118 to be compact and/or an even more compact sensor blade 112 than if only some of reception induction coils 116 overlap with transmission induction coils 114.

The following subject matter of this paragraph characterizes example 73 of the present disclosure, wherein example 73 also includes the subject matter according to any one of examples 40 to 72, above. Referring generally to FIG. 1 and particularly to, e.g., FIGS. 2-6, at least one of reception induction coils 116 and at least one of transmission induction coils 114 overlap in overlap region 148 and are separated by one or more dielectric layers 150 in overlap region 148.

At least where reception induction coils 116 and transmission induction coils 114 overlap (i.e., in overlap regions 148), reception induction coils 116 and transmission induction coils 114 are separated to avoid direct electrical connection between reception induction coils 116 and transmission induction coils 114. Dielectric layers 150 (as shown in the example of FIG. 5) are electrically insulating layers of sensor blade 112. More dielectric layers 150 may provide more electrical isolation and/or robustness against electrical breakdown than one dielectric layer 150. Dielectric layers 150 generally are very thin (e.g., less than 100 µm (micron), less than 10 µm, or less than 1 µm thick). Dielectric layers 150 generally are resilient enough to maintain dielectric integrity after flexing of sensor blade 112.

The following subject matter of this paragraph characterizes example 74 of the present disclosure, wherein example 74 also includes the subject matter according to any one of examples 40 to 73, above. Referring generally to FIG. 1 and particularly to, e.g., FIGS. 2-6, transmission induction coils 114 and reception induction coils 116 are separated by one or more dielectric layers 150.

In general, transmission induction coils 114 and reception induction coils 116 may be separated to avoid direct electrical connection between transmission induction coils 114 and reception induction coils 116. More dielectric layers 150 may provide more electrical isolation and/or robustness against electrical breakdown of one dielectric layer 150.

The following subject matter of this paragraph characterizes example 75 of the present disclosure, wherein example 75 also includes the subject matter according to example 74, above. Referring generally to FIG. 1 and particularly to, e.g., FIGS. 2-6, transmission induction coils 114 and reception induction coils 116 are formed on opposite sides of a single one of one or more dielectric layers 150.

Dielectric layers 150 each may be substrates that can support electromechanical structures. For example, electronic circuit elements may be deposited, screen printed, etched, and/or molded on dielectric layers 150. Transmission induction coils 114 and/or reception induction coils 116 may be formed on the same or different dielectric layers 150. In some examples, transmission induction coils 114 and reception induction coils 116 may be formed on opposite sides of a single one of dielectric layers 150 to reduce the total number of layers needed for sensor blade 112, to simplify production of sensor blade 112, and/or to simplify registration (relative placement) of transmission induction coils 114 and reception induction coils 116.

The following subject matter of this paragraph characterizes example 76 of the present disclosure, wherein example 76 also includes the subject matter according to any one of examples 40 to 75, above. Referring generally to FIG. 1 and particularly to, e.g., FIGS. 2-6, transmission induction coils 114 and reception induction coils 116 are located in different layers within sensor blade 112.

To simplify production of transmission induction coils 114, production of reception induction coils 116, and/or production of sensor blade 112, transmission induction coils 114 and reception induction coils 116 may be fabricated on and/or located in different layers within sensor blade 112. For example and as shown in FIG. 5, transmission induction coils 114 may be located in one coil layer 154 and reception induction coils 116 may be located in another coil layer 154. Each of coil layers 154 may be fabricated independently and then layered together to form sensor blade 112. Coil layers 154 may include dielectric material between and/or around each of transmission induction coils 114 and/or reception induction coils 116. Coil layers 154 may be layered together with or without intervening dielectric layers 150 provided that transmission induction coils 114 and reception induction coils 116 remain electrically isolated from each other. Coil layers 154 may be very thin (e.g., less than 100 µm, less than 10 µm, or less than 1 µm thick). Coil layers 154 generally are resilient enough to maintain integrity of transmission induction coils 114 and/or reception induction coils 116 after flexing of sensor blade 112.

The following subject matter of this paragraph characterizes example 77 of the present disclosure, wherein example 77 also includes the subject matter according to any one of examples 40 to 76, above. Referring generally to FIG. 1 and particularly to, e.g., FIGS. 2-6, transmission induction coils 114 comprise graphene.

Transmission induction coils 114 are electrical circuit elements with electrically conductive material formed into a coil configuration. Transmission induction coils 114 generally are microelectronic devices and generally are formed in very thin layers on or in a substrate (e.g., layers of less than 100 µm, less than 10 µm, or less than 1 µm thick). Graphene is a very thin, conductive form of carbon that may be formed in layers, typically only a single atom thick. Forming transmission induction coils 114 of graphene may permit thin transmission induction coils 114, thin coil layers 154, and/or thin sensor blades 112, which may facilitate a high density of transmission induction coils 114 and/or use of sensor blade 112 in thin gaps 144 (e.g., an average of less than 10 mm, less than 1 mm, or less than 0.1 mm thick).

The following subject matter of this paragraph characterizes example 78 of the present disclosure, wherein example 78 also includes the subject matter according to any one of examples 40 to 77, above. Referring generally to FIG. 1 and particularly to, e.g., FIGS. 2-6, reception induction coils 116 comprise graphene.

Reception induction coils 116 are electrical circuit elements with electrically conductive material formed into a coil configuration. Reception induction coils 116 generally are microelectronic devices and generally are formed in very thin layers on or in a substrate (e.g., layers of less than 100 µm, less than 10 µm, or less than 1 µm thick). Forming reception induction coils 116 of graphene may permit thin reception induction coils 116, thin coil layers 154, and/or thin sensor blades 112, which may facilitate a high density of reception induction coils 116 and/or use of sensor blade 112 in thin gaps 144.

The following subject matter of this paragraph characterizes example 79 of the present disclosure, wherein example 79 also includes the subject matter according to any one of examples 40 to 78, above. Referring generally to FIG. 1 and particularly to, e.g., FIGS. 2-6, transmission induction coils 114 are spiral planar inductors.

Spiral planar inductors may be formed in thin layers which may facilitate a high density of transmission induction coils 114 and/or use of sensor blade 112 in thin gaps 144. Spiral planar inductors are electrical inductors that have a planar and spiral form. Two examples of spiral planar inductors are schematically shown in FIG. 6. Reception induction coil 116 of FIG. 6 has a typical planar spiral form with an electrical trace spiraling about a common center following a simple geometric form (a rectangular form in the example of FIG. 6; other common forms are circles, ellipses, squares, and convex polygons). Transmission induction coil 114 of FIG. 6 has a planar, concave spiral form in which the electrical trace spirals about a common center following a concave polygonal form. Spiral planar inductors may be referred to as pancake inductors.

The following subject matter of this paragraph characterizes example 80 of the present disclosure, wherein example 80 also includes the subject matter according to any one of examples 40 to 79, above. Referring generally to FIG. 1 and particularly to, e.g., FIGS. 2-6, reception induction coils 116 are spiral planar inductors.

Spiral planar inductors may be formed in thin layers which may facilitate a high density of reception induction coils 116 and/or use of sensor blade 112 in thin gaps 144.

The following subject matter of this paragraph characterizes example 81 of the present disclosure, wherein example 81 also includes the subject matter according to any one of examples 40 to 80, above. Referring generally to FIG. 1 and particularly to, e.g., FIGS. 2-6, sensor blade 112 comprises exterior protection layers 152 that cover transmission induction coils 114 and reception induction coils 116.

As shown in the example of FIG. 5, exterior protection layer 152 isolates transmission induction coils 114 and reception induction coils 116 from mechanical contact, electrical contact, and/or environmental effects. For example, exterior protection layer 152 may be rugged, abrasion resistant, water tight, and/or gas tight. Exterior protection layer 152, like sensor blade 112, may be semi-flexible and/or capable of withstanding flexing that may occur when sensor blade 112 is inserted into gap 144. Exterior protection layer 152 may include, and/or may be, a semi-flexible coating of polyurethane material and/or a scratch-resistant and toughened glass (e.g., GORILLA GLASS brand glass). Sensor blade 112 may comprise exterior protection layer 152 at all environmentally exposed edges and/or surfaces. Generally, exterior protection layer 152 is very thin (e.g., less than 1 mm, less than 0.1 mm, or less than 0.01 mm.

The following subject matter of this paragraph characterizes example 82 of the present disclosure, wherein example 82 also includes the subject matter according to any one of examples 40 to 81, above. Referring generally to FIG. 1 and particularly to, e.g., FIGS. 2-6, each of transmission induction coils 114 has a lateral area of less than 1 square centimeter and greater than 100 square microns.

Small transmission induction coils 114 (having a lateral area of less than 1 square centimeter) permit small measurement sites 118 and/or high resolution measurement of separation distances 134. The lateral area of transmission induction coils 114 is the area of transmission induction coils 114 in blade plane 156 of sensor blade 112.

The following subject matter of this paragraph characterizes example 83 of the present disclosure, wherein example 83 also includes the subject matter according to any one of examples 40 to 82, above. Referring generally to FIG. 1 and particularly to, e.g., FIGS. 2-6, each of reception induction coils 116 has a lateral area of less than 1 square centimeter and greater than 100 square microns.

Small reception induction coils 116 (having a lateral area of less than 1 square centimeter) permit small measurement sites 118 and/or high resolution measurement of separation distances 134. The lateral area of reception induction coils 116 is the area of reception induction coils 116 in blade plane 156 of sensor blade 112.

The following subject matter of this paragraph characterizes example 84 of the present disclosure, wherein example 84 also includes the subject matter according to any one of examples 40 to 83, above. Referring generally to FIG. 1 and particularly to, e.g., FIGS. 2-6, sensor blade 112 has at least 1000 of measurement sites 118 at a density of greater than a single one of measurement sites 118 per square centimeter and less than 1,000,000 of measurement sites 118 per square centimeter.

Electronic feeler gauge 110 may have a high density of measurement sites 118 and/or a large number of measurement sites 118 to provide a high resolution thickness map of gap 144. Sensor blade 112 may have an active surface area (surface area including measurement sites 118) and/or width comparable to typical gaps 144. Hence, sensor blade 112 may have an active surface area of greater than 10 $cm^2$ (square centimeters) or greater than 50 $cm^2$. Sensor blade 112 may have a width of greater than 1 cm, greater than 5 cm, or greater than 20 cm.

The following subject matter of this paragraph characterizes example 85 of the present disclosure, wherein example 85 also includes the subject matter according to any one of examples 40 to 84, above. Referring generally to FIG. 1 and particularly to, e.g., FIGS. 2-6, sensor blade 112 has a thickness that is less than 0.5 mm and greater than 0.001 mm.

Sensor blade 112 may be thin to fit within a wide range of gap 144 sizes. Sensor blade 112 may be thin enough to fit into and/or measure gaps 144 that are thin (e.g., as small as 0.5 mm). Sensor blade 112 may be thin enough to fit into and/or measure residual space around shim 170 in gap 144. In the aerospace industry, relative positional tolerances between parts may be less than 0.05 inch (about 1 mm) and therefore gaps 144 and/or residual space may be less than 1 mm.

The following subject matter of this paragraph characterizes example 86 of the present disclosure, wherein example 86 also includes the subject matter according to any one of examples 40 to 85, above. Referring generally to FIG. 1 and particularly to, e.g., FIGS. 2-6, electronic feeler gauge 110 further comprises computing system 160 that is operatively coupled to receiving system 124.

Computing system 160 generally is configured (e.g., programmed) to control transmitting system 120 and/or receiving system 124. Computing system 160 may coordinate generating transmitted probe signals 122 with transmission induction coils 114, receiving response signals 126 with reception induction coils 116, and/or determining separation distances 134.

Computing system 160 may be operatively coupled to transmitting system 120 and/or receiving system 124 by one or more electronic communications links. Computing system 160 may comprise, and/or may be a computer (e.g., comprising a processor and memory) and/or dedicated hardware. Computing system 160 may implement its functions (e.g., controlling generation of transmitted probe signals 122, controlling reception of response signals 126, and/or determining separation distances 134) in software, firmware, and/or hardware.

The following subject matter of this paragraph characterizes example 87 of the present disclosure, wherein example 87 also includes the subject matter according to example 86, above. Referring generally to FIG. 1 and particularly to, e.g., FIGS. 2-6, computing system 160 is configured to generate 3D virtual model 162 of gap 144, probed by sensor blade 112 based upon response signals 126 and measurement sites 118.

3D virtual model 162 represents gap 144 probed by electronic feeler gauge 110 and sensor blade 112 and may be used to analyze gap 144, to select one or more shims 170 to fill gap 144, and/or to create one or more shims 170 to fill gap 144. 3D virtual model 162 may be used to determine the volume, surface area, and/or shape of gap 144. Accurate representation of gap 144 (such as 3D virtual model 162) provides an accurate guide to determine the size and shape of one or more shims 170 to fill gap 144.

Computing system 160 is configured to generate 3D virtual model 162 based upon separation distances 134 determined at measurement sites 118. Computing system 160 may be configured to determine separation distances 134 based upon response signals 126 and/or transmitted probe signals 122. Additionally or alternatively, computing system 160 may receive (e.g., from receiving system 124) separation distances 134 that were determined based upon response signals 126 and/or transmitted probe signals 122. 3D virtual model 162 may be a point cloud, a polygon mesh, and/or a 3D representation (e.g., a surface tessellation, a 3D wireframe, a 3D solid, or a 3D boundary representation).

The following subject matter of this paragraph characterizes example 88 of the present disclosure, wherein example 88 also includes the subject matter according to example 87, above. Referring generally to FIG. 1 and particularly to, e.g., FIGS. 2-6, computing system 160 is configured to identify suitable shims 170 to be inserted into gap 144 by comparing dimensions of candidate shims to 3D virtual model 162 of gap 144.

Computing system 160 may store dimensions of candidate shims and/or may be provided dimensions of candidate shims. The dimensions of candidate shims may be compared to 3D virtual model 162 to identify which one or more of candidate shims would be suitable to fill gap 144. For example, in FIG. 3, three shims 170 are arranged to together fill gap 144.

Computing system 160 may be configured to identify one or more suitable shims 170 from a collection of candidate shims to fill gap 144. Computing system 160 may be configured to identify and optionally rank several individual candidate shims which may each be suitable. Computing system 160 may be configured to identify a group of candidate shims that may be used together to fill gap 144 (hence, the group of candidate shims together are suitable shims 170). Computing system 160 additionally may identify an order and/or pattern for placement of the group of candidate shims within gap 144. Shims 170 may be formed of suitable structural materials such as brass, aluminum, titanium, and composite materials (e.g., fiberglass).

Identification of one or more suitable shims 170 assists installation of shims 170 in gap 144 because a technician does not need to trial fit shims 170 until suitable ones are found. Additionally or alternatively, the orientation, order, and/or placement of suitable shims 170 may be identified by computing system 160 to assist installation of shims 170 in the proper orientation, order, and/or placement.

The following subject matter of this paragraph characterizes example 89 of the present disclosure, wherein example 89 also includes the subject matter according to any one of examples 87 to 88, above. Referring generally to FIG. 1 and particularly to, e.g., FIGS. 2-6, computing system 160 comprises display 164 and is configured to render an image of 3D virtual model 162 of gap 144 on display 164.

Rendering an image of 3D virtual model 162 may assist verification by an operator that gap 144 was measured successfully. Additionally or alternatively, the image of 3D virtual model 162 may be used to identify and/or to verify suitable shims 170 that are to be used to fill gap 144.

Generally, computing system 160 is configured to interactively display 3D virtual model 162 such that an operator may zoom and rotate the view to see different perspectives of 3D virtual model 162. Computing system 160 may be configured to render images of candidate shims and/or suitable shims 170 with display 164 and may be configured to display comparative images (e.g., overlay, side-by-side, etc.). Display 164 is an electronic visual display such as an LED display, an LCD display, etc.

The following subject matter of this paragraph characterizes example 90 of the present disclosure, wherein example 90 also includes the subject matter according to any one of examples 86 to 89, above. Referring generally to FIG. 1 and particularly to, e.g., FIGS. 2-6, computing system 160 is configured to determine separation distances 134 based upon response signals 126. Separation distances 134 are at measurement sites 118 of sensor blade 112 between first surface 140 of first workpiece 136 and second surface 142 of second workpiece 138.

Computing system 160 is configured to determine separation distances 134 based upon response signals 126 and/or transmitted probe signals 122 corresponding to each of measurement sites 118. Response signals 126 are generated according to the presence and/or properties of electromagnetic fields (such as transmitted probe signals 122) at measurement sites 118. Location and composition of materials of first workpiece 136 and second workpiece 138 affect response signals 126 from measurement sites 118 between first surface 140 (of first workpiece 136) and second surface 142 (of second workpiece 138). For each of measurement sites 118, measured response signals 126 may be compared to calibrated values and/or models of response signals to determine separation distances 134.

The following subject matter of this paragraph characterizes example 91 of the present disclosure, wherein example 91 also includes the subject matter according to example 90, above. Referring generally to FIG. 1 and particularly to, e.g., FIGS. 2-6, computing system 160 is configured to identify suitable shims 170 to be inserted into gap 144, probed by sensor blade 112, by comparing dimensions of candidate shims to separation distances 134 at measurement sites 118.

Computing system 160 may store dimensions of candidate shims and/or may be provided dimensions of candidate shims. The dimensions of candidate shims may be compared to separation distances 134 at measurement sites 118 to identify which one or more of candidate shims would be suitable to fill gap 144. Computing system 160 may be configured to identify one or more suitable shims 170 from a collection of candidate shims to fill gap 144. Computing system 160 may be configured to identify and optionally rank several individual candidate shims which may each be suitable. Computing system 160 may be configured to identify a group of candidate shims that may be used together to fill gap 144 (hence, the group of candidate shims together are suitable shims 170). Computing system 160 additionally may identify an order and/or pattern for placement of the group of candidate shims within gap 144.

Identification of one or more suitable shims 170 assists installation of shims 170 in gap 144 because a technician does not need to trial fit shims 170 until suitable ones are found. Additionally or alternatively, the orientation, order, and/or placement of suitable shims 170 may be identified by computing system 160 to assist installation of shims 170 in the proper orientation, order, and/or placement.

The following subject matter of this paragraph characterizes example 92 of the present disclosure, wherein example 92 also includes the subject matter according to any one of examples 90 to 91, above. Referring generally to FIG. 1 and particularly to, e.g., FIGS. 2-6, computing system 160 comprises display 164 and is configured to display an image of separation distances 134 at measurement sites 118 on display 164.

Rendering an image of separation distances 134 may assist verification by an operator that gap 144 was measured successfully. Additionally or alternatively, the image of separation distances 134 may be used to identify and/or to verify suitable shims 170 that are to be used to fill gap 144.

The image of separation distances 134 at measurement sites 118 may be in the form of a graph, a table, a line profile, a surface profile, a polygonal mesh, and/or a volume rendering. For example, the image of separation distances 134 at measurement sites 118 may be a two-dimensional bar graph with each bar representing one of separation distances 134 at one of measurement sites 118 and each bar may be arranged to represent the two-dimensional arrangement of measurement sites 118.

Computing system 160 may be configured to interactively display separation distances 134 such that an operator may zoom and rotate the view to see different perspectives of separation distances 134. Computing system 160 may be configured to render images and/or dimensions of candidate shims and/or suitable shims 170 with display 164 and may be configured to display comparative images (e.g., overlay, side-by-side, etc.).

The following subject matter of this paragraph characterizes example 93 of the present disclosure, wherein example 93 also includes the subject matter according to any one of examples 86 to 92, above. Referring generally to FIG. 1 and particularly to, e.g., FIGS. 2-6, computing system 160 and receiving system 124 are configured to communicate wirelessly.

Wireless communication between computing system 160 and receiving system 124 facilitates remote operation of receiving system 124 and/or modular design of electronic feeler gauge 110. For example, computing system 160 may be physically separate or separable from receiving system 124. Suitable wireless communication protocols and techniques include infrared communication, radio communication, WI-FI brand protocol, and BLUETOOTH brand protocol.

The following subject matter of this paragraph characterizes example 94 of the present disclosure, wherein example 94 also includes the subject matter according to any one of examples 86 to 93, above. Referring generally to FIG. 1 and particularly to, e.g., FIGS. 2-6, sensor blade 112, transmitting system 120, and receiving system 124 are part of handheld probe 172. Computing system 160 is configured to wirelessly supply power to handheld probe 172.

Wireless power transfer between computing system 160 and handheld probe 172 facilitates remote operation of handheld probe 172 and/or modular design of electronic feeler gauge 110. With wireless power transfer, handheld probe 172 may be produced in a smaller package and without power cables as compared to electronic feeler gauge 110 that does not utilize wireless power transfer. Wireless power transfer may be performed by inductive charging (inductively coupled components), by capacitive charging (capacitively coupled components), and/or by radiative charging (e.g., by transfer of beams of radio energy, microwave energy, laser energy, etc.).

Referring generally to FIG. 7 and with reference to FIGS. 1-6, method 400 of measuring separation distances 134 within gap 144 is disclosed. Method 400 comprises (block 402) inserting sensor blade 112 into gap 144, defined by first surface 140 and second surface 142, (block 404) generating transmitted probe signals 122 from transmission induction coils 114, (block 406) receiving response signals 126 with reception induction coils 116 in response to transmitted probe signals 122, and (block 408) determining separation distances 134 between first surface 140 and second surface 142 at measurement sites 118 based upon response signals 126. Sensor blade 112 comprises transmission induction coils 114, reception induction coils 116, and measurement sites 118 spaced in two dimensions about sensor blade 112. Each of measurement sites 118 is associated with at least one of transmission induction coils 114 and at least one of reception induction coils 116. The preceding subject matter of this paragraph characterizes example 95 of the present disclosure.

Method 400 permits measuring separation distances 134 within gap 144 which may be used to select one or more shims 170 to fill gap 144, to form one or more shims 170 to fill gap 144, and/or to fill gap 144 with one or more shims 170. Additionally or alternatively, method 400 may be used to verify proper assembly of components (e.g., first workpiece 136 and second workpiece 138) and/or proper assembly of shim 170 within gap 144. Method 400 may result in a 3D measurement of gap 144 (e.g., 3D virtual model 162).

Method 400 comprises inserting 402 sensor blade 112 into gap 144. Sensor blade 112 is configured to emit transmitted probe signals 122 with transmission induction coils 114 and to detect response signals 126 with reception induction coils 116. Sensor blade 112 within gap 144 permits measuring of first surface 140 and second surface 142 of gap 144.

Method 400 comprises generating 404 transmitted probe signals 122, generally while at least a portion of sensor blade 112 is within gap 144, to probe first surface 140 and/or second surface 142 at measurement sites 118.

Method 400 comprises receiving 406 response signals 126 due to interaction of transmitted probe signals 122 with first surface 140 and/or second surface 142. Variations in response signals 126 (relative to no gap 144, relative to a known thickness and composition of gap 144, and/or relative to transmitted probe signals 122) provides information about gap 144, first surface 140, and/or second surface 142, in particular, separation distances 134 between first surface 140 and second surface 142.

Method 400 comprises determining 408 separation distances 134 at measurement sites 118 based upon response signals 126. Determining 408 comprises determining magnitude- and/or frequency-dependent measures of response signals 126 such as intensity, energy, amplitude, modulation, and/or phase. Measures of response signals 126 may be related to properties of gap 144, first surface 140, and/or second surface 142.

The following subject matter of this paragraph characterizes example 96 of the present disclosure, wherein example 96 also includes the subject matter according to example 95, above. Referring generally to FIG. 7, according to method 400, (block 404) generating transmitted probe signals 122 from transmission induction coils 114 comprises generating a first one of transmitted probe signals 122 from one or more of transmission induction coils 114, associated with first one of measurement sites 118, and generating a second one of transmitted probe signals 122 from one or more of transmission induction coils 114, associated with second one of measurement sites 118. Additionally, according to method 400, (block 406) receiving response signals 126 with reception induction coils 116 in response to transmitted probe signals 122 comprises receiving a first one of response signals 126 with one or more of reception induction coils 116 in response to first one of transmitted probe signals 122 and receiving a second one of response signals 126 with one or more of reception induction coils 116 in response to second one of transmitted probe signals 122. Furthermore, according to method 400, (block 408) determining separation distances 134 between first surface 140 and second surface 142 at measurement sites 118, based upon response signals 126, comprises determining a first one of separation distances 134 between first surface 140 and second surface 142 at first one of measurement sites 118, based upon first one of response signals 126, and determining a second one of separation distances 134 between first surface 140 and second surface 142 at second one of measurement sites 118, based upon the second one of response signals 126.

Method 400 may comprise using more than one of measurement sites 118 of sensor blade 112. For example, generating 404 may comprise generating first one and second one of transmitted probe signals 122 at different measurement sites 118. Receiving 406 may comprise receiving first one and second one of response signals 126 from different measurement sites 118. Determining 408 may comprise determining first one and second one of separation distances 134 at different measurement sites 118 based upon first one and second one of response signals 126. Generating 404 and receiving 406 for different measurement sites 118 may be performed simultaneously, at least partially simultaneously, or sequentially. Using more than one of measurement sites 118 permits measuring corresponding more than one separation distances 134 at different ones, optionally each, of measurement sites 118.

The following subject matter of this paragraph characterizes example 97 of the present disclosure, wherein example 97 also includes the subject matter according to any one of examples 95 to 96, above. Referring generally to FIG. 7, method 400 further comprises (block 410) identifying at least one of measurement sites 118 that is outside of gap 144 based upon response signals 126 from one or more reception induction coils 116, associated with at least one of measurement sites 118.

Inserting 402 may comprise partially inserting sensor blade 112 into gap 144 (e.g., sensor blade 112 does not fully fit into gap 144 and/or sensor blade 112 is not entirely inserted into gap 144). For measurement sites 118 outside of gap 144, method 400 may comprise identifying 410 which of response signals 126 do not have the characteristics of response signals 126 within gap 144, indicate absence of gap 144, and/or indicate a gap 144 greater than a predefined threshold thickness (e.g., greater than 10 cm or greater than 100 cm). Such response signals 126 may be identified as outside of gap 144. Response signals 126 which may indicate the absence of gap 144, may have an intensity, amplitude, and/or modulation above a predefined upper limit or may have an intensity, amplitude, and/or modulation below a predefined lower limit.

Determining which measurement sites 118 are in and/or out of gap 144 may provide a measure and/or estimate of the depth of gap 144 and/or the cross sectional area of gap 144 (e.g., by providing the depth and/or area of sensor blade 112 within gap 144).

The following subject matter of this paragraph characterizes example 98 of the present disclosure, wherein example 98 also includes the subject matter according to any one of examples 95 to 97, above. Referring generally to FIG. 7, according to method 400, (block 408) determining separation distances 134 between first surface 140 and second surface 142 at measurement sites 118, based upon response signals 126, comprises determining a magnitude measure for each of response signals 126. The magnitude measure is selected from the group consisting of amplitude, intensity, energy, and power. Each of separation distances 134 is associated with a corresponding one of measurement sites 118. Separation distances 134 are related to the magnitude measures of response signals 126 of reception induction coils 116, associated with corresponding ones of measurement sites 118.

Determining 408 may comprise determining characteristics of response signals for each of response signals 126. Characteristics may include magnitude- and/or frequency-dependent measures such as one or more of intensity, amplitude, energy, power, modulation, and phase. Magnitude measures may indicate separation distances 134 because the (AC or DC) electromagnetic fields of transmitted probe signals 122 may lose intensity (and related parameters) in relation to distance between sensor blade 112 and surfaces of gap 144 (i.e., first surface 140 and/or second surface 142). Frequency measures may indicate complex electromagnetic response of materials of first workpiece 136 and/or second workpiece 138. Frequency measure may be used alone or in conjunction with magnitude measures to determine separation distances 134.

The following subject matter of this paragraph characterizes example 99 of the present disclosure, wherein example 99 also includes the subject matter according to any one of examples 95 to 98, above. Referring generally to FIG. 7, method 400 further comprises creating 3D virtual model 162 of gap 144 based upon separation distances 134 at measurement sites 118.

3D virtual model 162 represents gap 144 probed by electronic feeler gauge 110 and sensor blade 112 and may be used to analyze gap 144, to select one or more shims 170 to fill gap 144, and/or to create one or more shims 170 to fill gap 144. 3D virtual model 162 may be used to determine the volume, surface area, and/or shape of gap 144. Accurate representation of gap 144 (such as 3D virtual model 162) provides an accurate guide to determine the size and shape of one or more shims 170 to fill gap 144.

3D virtual model 162 may be created based upon separation distances 134 determined at measurement sites 118 (which are spaced in two dimensions about sensor blade 112). 3D virtual model 162 may be a point cloud, a polygon mesh, and/or a 3D representation (e.g., a surface tessellation, a 3D wireframe, a 3D solid, or a 3D boundary representation).

The following subject matter of this paragraph characterizes example 100 of the present disclosure, wherein example 100 also includes the subject matter according to example 99, above. Referring generally to FIG. 7, method 400 further comprises (block 412) selecting one or more suitable shims 170 to fit gap 144 based upon 3D virtual model 162 of gap 144.

Selecting 412 may comprise comparing dimensions of candidate shims to 3D virtual model 162. For example, selecting 412 may comprise referencing a collection of dimensions of candidate shims to compare the dimensions of candidate shims to 3D virtual model 162. Selecting 412 may comprise identifying one or more candidate shims (each potential suitable shims 170) that may fill gap 144 and/or may comprise identifying one or more groups of candidate shims that together may fill gap 144 (hence, each of the groups of shims are suitable shims 170). Selecting 412 may comprise identifying an order, orientation, and/or pattern for placement of the candidate shims and/or the groups of candidate shims within gap 144. Selecting 412 may comprise ranking candidate shims and/or groups of candidate shims.

Selecting 412 suitable shims 170 and/or identification of one or more suitable shims 170 may assist installation of shims 170 in gap 144 because a technician does not need to trial fit shims 170 until suitable ones are found. Additionally or alternatively, selecting 412 the orientation, order, and/or placement of suitable shims 170 may assist installation of shims 170 in the proper orientation, order, and/or placement.

The following subject matter of this paragraph characterizes example 101 of the present disclosure, wherein example 101 also includes the subject matter according to any one of examples 99 to 100, above. Referring generally to FIG. 7, method 400 further comprises identifying suitable shims 170 to fit gap 144 by comparing dimensions of candidate shims to 3D virtual model 162 of gap 144.

Identifying and/or selecting 412 suitable shims 170 may include comparing dimensions of candidate shims to 3D virtual model 162 of gap 144. Comparing may comprise identifying and/or calculating respective dimensions in 3D virtual model 162.

The following subject matter of this paragraph characterizes example 102 of the present disclosure, wherein example 102 also includes the subject matter according to any one of examples 99 to 101, above. Referring generally to FIG. 7, method 400 further comprises (block 414) forming one or more suitable shims 170 to fit gap 144 based upon 3D virtual model 162 of gap 144.

Forming 414 may comprise forming shims 170 by machining, molding, stamping, and/or additive manufacturing according to the size and shape of 3D virtual model 162. Forming 414 may be automated (e.g., computer-numerical-controlled machining and/or additive manufacturing) based upon 3D virtual model 162. Formed shims 170 may be assembled into gap 144 to fill gap 144.

The following subject matter of this paragraph characterizes example 103 of the present disclosure, wherein example 103 also includes the subject matter according to any one of examples 95 to 102, above. Referring generally to FIG. 7, method 400 further comprises (block 412) selecting one or more suitable shims 170 to fit gap 144 based upon separation distances 134 at measurement sites 118.

Selecting 412 may comprise comparing dimensions of candidate shims to separation distances 134 at measurement sites 118. For example, selecting 412 may comprise referencing a collection of dimensions of candidate shims to compare the dimensions of candidate shims to separation distances 134. Selecting 412 may comprise identifying one or more candidate shims (each potential suitable shims 170) that may fill gap 144 and/or may comprise identifying one or more groups of candidate shims that together may fill gap 144 (hence, each of the groups of shims are suitable shims 170). Selecting 412 may comprise identifying an order, orientation, and/or pattern for placement of the candidate shims and/or the groups of candidate shims within gap 144. Selecting 412 may comprise ranking candidate shims and/or groups of candidate shims.

Selecting 412 suitable shims 170 and/or identification of one or more suitable shims 170 may assist installation of shims 170 in gap 144 because a technician does not need to trial fit shims 170 until suitable ones are found. Additionally or alternatively, selecting 412 the orientation, order, and/or placement of suitable shims 170 may assist installation of shims 170 in the proper orientation, order, and/or placement.

The following subject matter of this paragraph characterizes example 104 of the present disclosure, wherein example 104 also includes the subject matter according to any one of examples 95 to 103, above. Referring generally to FIG. 7, method 400 further comprises displaying an image of gap 144 based upon separation distances 134 at measurement sites 118.

Displaying the image of separation distances 134 may assist verification by an operator that gap 144 was measured successfully. Additionally or alternatively, the image of separation distances 134 may be used to identify and/or to verify suitable shims 170 that are to be used to fill gap 144.

The image of separation distances 134 at measurement sites 118 may be in the form of a graph, a table, a line profile, a surface profile, a polygonal mesh, and/or a volume rendering. For example, the image of separation distances 134 at measurement sites 118 may be a two-dimensional bar graph with each bar representing one of separation distances 134 at one of measurement sites 118 and each bar may be arranged to represent the two-dimensional arrangement of measurement sites 118.

Displaying the image of separation distances 134 may be interactive such that an operator may zoom and rotate the view to see different perspectives of separation distances 134. Method 400 may further comprise rendering images and/or dimensions of candidate shims and/or suitable shims 170 in a manner such that separation distances 134 and shims may be compared (e.g., with comparative images such as overlays, side-by-side images, etc.).

The following subject matter of this paragraph characterizes example 105 of the present disclosure, wherein example 105 also includes the subject matter according to any one of examples 95 to 104, above. Referring generally to FIG. 7, according to method 400, gap 144 is a calibration gap with a known thickness profile between first surface 140 and second surface 142. Method 400 further comprises calibrating electronic feeler gauge 110 that comprises sensor blade 112 by generating separation distance signals 132 based upon response signals 126 and comparing separation distance signals 132 to the known thickness profile to generate calibration coefficients for measurement sites 118. According to method 400, (block 408) determining separation distances 134 between first surface 140 and second surface 142 at measurement sites 118, based upon response signals 126, comprises determining separation distances 134 based upon response signals 126 and the calibration coefficients.

Electronic feeler gauge 110 may be operated more reliably and/or more accurately if calibrated. Method 400 may comprise calibrating by using the calibration gap with the known thickness profile and/or with known materials. For example, if the calibration gap has a uniform thickness profile but response signals 126 obtained within the calibration gap are not uniform, calibrating may comprise applying calibration coefficients for measurement sites 118 to make separation distances 134 uniform. Calibration coefficients may be applied by mathematical transformation of response signals 126 during the calculation of separation distances 134 based upon response signals 126. Mathematical transformation may be linear or non-linear and generally is monotonic (i.e., not multivalued). Calibration coefficients may be applied by adjusting direct electrical current 128 and/or modulated signals 130 to produce transmitted probe signals 122 and thereby response signals 126 within the calibration gap such that response signals 126 represent the known thickness profile of the calibration gap.

The following subject matter of this paragraph characterizes example 106 of the present disclosure, wherein example 106 also includes the subject matter according to example 105, above. Referring generally to FIG. 7, according to method 400, comparing separation distance signals 132 to the known thickness profile to generate calibration coefficients for measurement sites 118 comprises determining calibrated separation distances 135 at measurement sites 118.

Calibrated separation distances 135 are separation distances 134 with calibration coefficients applied. Calibrated separation distances 135 may be determined for other gaps 144 and used to determine the size and/or shape of the other gaps 144 with more reliability and/or accuracy than with separation distances 134.

The following subject matter of this paragraph characterizes example 107 of the present disclosure, wherein example 107 also includes the subject matter according to example 106, above. Referring generally to FIG. 7, according to method 400, comparing separation distance signals 132 to the known thickness profile to generate calibration coefficients for measurement sites 118 comprises determining one or more calibration coefficients for each of measurement sites 118 to mathematically transform separation distance signals 132 into calibrated separation distances 135.

Mathematical transformation has the advantage that it may be performed in hardware, software, and/or firmware, and that it may be performed during or after collecting separation distance signals 132 and/or determining separation distances 134. Mathematical transformation may be linear or non-linear and generally is monotonic (i.e., not multivalued). Mathematically transforming separation distance signals 132 and/or separation distances 134 into calibrated separation distances 135 may be performed in hardware, software, and/or firmware, for example in receiving system 124. Additionally or alternatively, mathematically transforming separation distance signals 132 and/or separation distances 134 into calibrated separation distances 135 may be performed post hoc. For example, separation distance signals 132 may be collected (and separation distances 134 may be determined) based on measurements in first gap 144 (an unknown gap or gap under test), calibration coefficients for each of measurement sites 118 may be generated based on measurements in the calibration gap, and then the calibration coefficients may be applied (via mathematical transformation) to separation distance signals 132 and/or separation distances 134 to determine calibrated separation distances 135 for first gap 144.

The following subject matter of this paragraph characterizes example 108 of the present disclosure, wherein example 108 also includes the subject matter according to example 107, above. Referring generally to FIG. 7, according to method 400, comparing separation distance signals 132 to the known thickness profile to generate calibration coefficients for measurement sites 118 comprises determining one or more calibration coefficients for each of measurement sites 118 to linearly transform separation distance signals 132 into calibrated separation distances 135.

Linear transformation generally is simpler to implement and faster to perform than non-linear transformation.

The following subject matter of this paragraph characterizes example 109 of the present disclosure, wherein example 109 also includes the subject matter according to any one of examples 105 to 108, above. Referring generally to FIG. 7, method 400 further comprises adjusting individual ones of transmitted probe signals 122 from transmission induction coils 114 according to the calibration coefficients to produce calibrated transmitted probe signals 123.

Calibration coefficients may be applied by adjusting transmitted probe signals 122 according to the calibration coefficients to produce calibrated transmitted probe signals 123. Transmitted probe signals 122 may be adjusted by adjusting direct electrical current 128 and/or modulated signals 130.

Calibrated transmitted probe signals 123 produced in calibration gap result in response signals 126 that represent the known thickness profile of the calibration gap. Response signals 126 that result from calibrated transmitted probe signals 123 are calibrated response signals 127.

The following subject matter of this paragraph characterizes example 110 of the present disclosure, wherein example 110 also includes the subject matter according to example 109, above. Referring generally to FIG. 7, method 400 further comprises (a) generating calibrated transmitted probe signals 123 with sensor blade 112 in the calibration gap, (b) receiving calibrated response signals 127 with reception induction coils 116 in response to calibrated transmitted probe signals 123, (c) determining calibrated separation distances 135 between first surface 140 and second surface 142 at measurement sites 118 based upon calibrated response signals 127, and (d) verifying that calibrated separation distances 135 match the known thickness profile.

Calibrated separation distances 135 may be determined from calibrated response signals 127. Calibration of electronic feeler gauge 110 may be verified by comparing calibrated separation distances 135 with the known thickness profile of the calibration gap. Calibrated separation distances 135 and the known thickness profile may match if absolute deviations in thicknesses, volume, and/or shape are less than predetermined thresholds. For example, the calibration may be verified if the each of absolute differences between calibrated separation distances 135 at measurement sites 118 and the known thickness profile at respective measurement sites 118 is less than a predetermined threshold.

The following subject matter of this paragraph characterizes example 111 of the present disclosure, wherein example 111 also includes the subject matter according to any one of examples 105 to 110, above. Referring generally to FIG. 7, method 400 further comprises adjusting separation distance signals 132 according to the calibration coefficients to produce calibrated separation distances 135 that match the known thickness profile.

Calibration coefficients may be applied by adjusting separation distance signals 132 and/or response signals 126 according to the calibration coefficients. Separation distance signals 132 and/or response signals 126 may be adjusted by mathematical transformation and/or by adjusting electrical characteristics of receiving system 124. For example, if receiving system 124 includes a gain-controlled circuit (e.g., an operational amplifier, a tuned circuit, etc.) to receive response signals 126 and/or to generate separation distance signals 132, the gain-controlled circuit may be adjusted to increase or decrease its gain and thereby adjust the received response signals 126 and/or the generated separation distance signals 132 accordingly.

The following subject matter of this paragraph characterizes example 112 of the present disclosure, wherein example 112 also includes the subject matter according to any one of examples 95 to 111, above. Referring generally to FIG. 7, according to method 400, (block 404) generating transmitted probe signals 122 from transmission induction coils 114 comprises driving direct electrical current 128 across transmission induction coils 114 to produce transmitted probe signals 122.

Driving direct electrical current 128 across transmission induction coils 114 produces magnetic induction fields as transmitted probe signals 122. Magnetic induction fields generally are affected by the presence, type, and/or arrangement of first surface 140, second surface 142, first workpiece 136, and/or second workpiece 138.

The following subject matter of this paragraph characterizes example 113 of the present disclosure, wherein example 113 also includes the subject matter according to example 112, above. Referring generally to FIG. 7, according to method 400, transmitted probe signals 122 are steady-state magnetic fields.

Steady-state magnetic fields generally are generated by steady-state electrical current (i.e., direct electrical current 128) flowing through transmission induction coils 114. Steady-state magnetic fields permeate beyond transmission induction coils 114 into the space near sensor blade 112, measurement site 118, and transmission induction coil 114 associated with each steady-state magnetic field. Steady-state magnetic fields are distorted by and interact with metal, metallic materials, magnetic materials, magnetically permeable materials, and electrically conductive materials. Hence, transmitted probe signals 122 may be affected by the presence, type, and/or arrangement of first surface 140 and/or second surface 142 that include any such materials.

The following subject matter of this paragraph characterizes example 114 of the present disclosure, wherein example 114 also includes the subject matter according to any one of examples 95 to 111, above. Referring generally to FIG. 7, according to method 400, (block 404) generating transmitted probe signals 122 from transmission induction coils 114 comprises driving modulated signals 130 across transmission induction coils 114 to produce transmitted probe signals 122.

Driving modulated signals 130 across transmission induction coils 114 produces electromagnetic induction fields (AC magnetic fields) as transmitted probe signals 122. Electromagnetic induction fields generally are affected by the presence, type, and/or arrangement of first surface 140, second surface 142, first workpiece 136, and/or second workpiece 138. Utilizing lower frequencies of modulated electromagnetic radiation (e.g., less than 100 kHz, less than 1 kHz, or less than 0.1 kHz) may penetrate deeper into first workpiece 136 and second workpiece 138. Utilizing higher frequencies (e.g., microwave frequencies or radio frequencies such as greater than 0.1 MHz, greater than 10 MHz, or greater than 1,000 MHz) may emphasize surface interactions of first workpiece 136 and second workpiece 138.

The following subject matter of this paragraph characterizes example 115 of the present disclosure, wherein example 115 also includes the subject matter according to example 114, above. Referring generally to FIG. 7, according to method 400, transmitted probe signals 122 are static alternating electromagnetic fields.

Static (i.e., steady-state) alternating electromagnetic induction fields (static, AC magnetic fields) are generated by steady-state modulated signals 130. Static, alternating electromagnetic induction fields have static (i.e., steady state) properties such as amplitude, modulation, and phase that generally are affected by the presence, type, and/or arrangement of first surface 140, second surface 142, first workpiece 136, and/or second workpiece 138. Utilizing static properties facilitates detection of effects on transmitted probe signals 122 due to first surface 140, second surface 142, first workpiece 136, and/or second workpiece 138 at gap 144.

The following subject matter of this paragraph characterizes example 116 of the present disclosure, wherein example 116 also includes the subject matter according to any one of examples 114 to 115, above. Referring generally to FIG. 7, according to method 400, (block 404) generating transmitted probe signals 122 from transmission induction coils 114 comprises frequency-division multiplexing modulated signals 130 to transmission induction coils 114.

Frequency-division multiplexing by transmitting modulated signals 130 to different ones of transmission induction coils 114 with different frequencies at different measurement sites 118 may reduce or eliminate significant cross talk between modulated signals 130 and/or transmitted probe signals 122 at different measurement sites 118.

The following subject matter of this paragraph characterizes example 117 of the present disclosure, wherein example 117 also includes the subject matter according to any one of examples 114 to 116, above. Referring generally to FIG. 7, according to method 400, (block 404) generating transmitted probe signals 122 from transmission induction coils 114 comprises generating transmitted probe signals 122 at different frequencies.

Transmitting transmitted probe signals 122 from different ones of transmission induction coils 114 with different frequencies at different measurement sites 118 may reduce or eliminate significant cross talk between modulated signals 130 and/or transmitted probe signals 122 at different measurement sites 118.

The following subject matter of this paragraph characterizes example 118 of the present disclosure, wherein example 118 also includes the subject matter according to any one of examples 114 to 115, above. Referring generally to FIG. 7, according to method 400, (block 404) generating transmitted probe signals 122 from transmission induction coils 114 comprises generating transmitted probe signals 122 at a common frequency.

Transmitting transmitted probe signals 122 from different ones of transmission induction coils 114 with the same frequency for all measurement sites 118 may facilitate electronics design and/or efficiency of the electronics (such as transmitting system 120) and/or may facilitate use of electronic feeler gauge 110 and/or sensor blade 112 at the common frequency. The common frequency may be selected to probe selected surface characteristics of gap 144 and/or to probe a selected surface depth within gap 144.

The following subject matter of this paragraph characterizes example 119 of the present disclosure, wherein example 119 also includes the subject matter according to any one of examples 114 to 118, above. Referring generally to FIG. 7, according to method 400, (block 406) receiving response signals 126 with reception induction coils 116 in response to transmitted probe signals 122 comprises frequency-division multiplexing response signals 126 from reception induction coils 116.

Frequency-division multiplexing by receiving response signals 126 from different ones of reception induction coils 116 with different frequencies at different measurement sites 118 may reduce or eliminate significant cross talk between measurement sites 118 and/or reception induction coils 116.

The following subject matter of this paragraph characterizes example 120 of the present disclosure, wherein example 120 also includes the subject matter according to any one of examples 114 to 119, above. Referring generally to FIG. 7, according to method 400, (block 406) receiving response signals 126 with reception induction coils 116 in response to transmitted probe signals 122 comprises receiving response signals 126 at different frequencies.

Receiving response signals 126 from different ones of reception induction coils 116 with different frequencies at different measurement sites 118 may reduce or eliminate significant cross talk between measurement sites 118 and/or reception induction coils 116.

The following subject matter of this paragraph characterizes example 121 of the present disclosure, wherein example 121 also includes the subject matter according to any one of examples 114 to 118, above. Referring generally to FIG. 7, according to method 400, (block 406) receiving response signals 126 with reception induction coils 116 in response to transmitted probe signals 122 comprises receiving response signals 126 at a common frequency.

Receiving response signals 126 from different ones of reception induction coils 116 with the same frequency for all measurement sites 118 may facilitate electronics design and/or efficiency of the electronics (such as receiving system 124) and/or may facilitate use of electronic feeler gauge 110 and/or sensor blade 112 at the common frequency. The common frequency may be selected to indicate selected surface characteristics of gap 144 and/or to probe a selected surface depth within gap 144.

The following subject matter of this paragraph characterizes example 122 of the present disclosure, wherein example 122 also includes the subject matter according to any one of examples 95 to 121, above. Referring generally to FIG. 7, according to method 400, (block 404) generating transmitted probe signals 122 from transmission induction coils 114 comprises generating transmitted probe signals 122 that comprise a carrier wave at a carrier frequency. Additionally, according to method 400, (block 406) receiving response signals 126 with reception induction coils 116 in response to the transmitted probe signals 122 comprises receiving response signals 126 that comprise a primary signal at the carrier frequency. Furthermore, according to method 400, (block 408), determining separation distances 134 between first surface 140 and second surface 142 at measurement sites 118, based upon response signals 126, comprises determining at least one of a relative amplitude, a relative modulation, and a phase shift of the primary signal relative to the carrier wave.

Transmitted probe signals 122 may include and/or may be a carrier wave (a signal with a definite waveform and frequency (i.e., the carrier frequency)). Transmitted probe signals 122 interact with materials at gap 144, the interactions generally causing an amplitude change, a modulation change, and a phase shift but not a frequency change. By determining an amplitude, a modulation, and/or a phase shift of the primary signals of response signals 126, the interaction of the materials at gap 144 and/or separation distances 134 may be determined.

Examples of the present disclosure may be described in the context of aircraft manufacturing and service method 1100 as shown in FIG. 8 and aircraft 1102 as shown in FIG. 9. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 9, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus (es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An electronic feeler gauge, comprising:
a sensor blade, comprising transmission induction coils, reception induction coils, and measurement sites spaced in two dimensions about the sensor blade, wherein each of the measurement sites is associated with at least one of the transmission induction coils and at least one of the reception induction coils;
a transmitting system, configured to drive direct electrical current across the transmission induction coils to produce transmitted probe signals from the transmission induction coils; and
a receiving system, configured to receive response signals from the reception induction coils due to the transmitted probe signals.

2. The electronic feeler gauge according to claim 1, wherein the transmitting system comprises a current source, configured to produce the direct electrical current, driven across the transmission induction coils.

3. The electronic feeler gauge according to claim 1, wherein the transmitted probe signals are steady-state magnetic fields.

4. The electronic feeler gauge according to claim 1, wherein the receiving system is configured to generate separation distance signals based upon the response signals, wherein the separation distance signals are related to separation distances at the measurement sites of the sensor blade between a first surface of a first workpiece and a second surface of a second workpiece, wherein the receiving system is configured to receive the response signals when at least one of the measurement sites is within a gap, defined by the first surface and the second surface.

5. The electronic feeler gauge according to claim 1, wherein each of the transmission induction coils is individually electrically addressed by the transmitting system.

6. The electronic feeler gauge according to claim 1, wherein the transmitting system comprises a de-multiplexer to produce one of the transmitted probe signals at a different time than another one of the transmitted probe signals.

7. The electronic feeler gauge according to claim 1, wherein the receiving system comprises a multiplexer to receive one of the response signals at a different time than another one of the response signals.

8. The electronic feeler gauge according to claim 1, wherein the reception induction coils are interdigitated with the transmission induction coils in the sensor blade.

9. The electronic feeler gauge according to claim 1, wherein at least one of the reception induction coils and at least one of the transmission induction coils overlap in an overlap region and are separated by one or more dielectric layers in the overlap region.

10. The electronic feeler gauge according to claim 1, wherein the transmission induction coils and the reception induction coils are separated by one or more dielectric layers and wherein the transmission induction coils and the reception induction coils are formed on opposite sides of a single one of the one or more dielectric layers.

11. The electronic feeler gauge according to claim 1, wherein the transmission induction coils comprise graphene.

12. The electronic feeler gauge according to claim 1, wherein the sensor blade comprises exterior protection layers that cover the transmission induction coils and the reception induction coils.

13. The electronic feeler gauge according to claim 1, wherein each of the transmission induction coils has a lateral area of less than 1 square centimeter and greater than 100 square microns.

14. The electronic feeler gauge according to claim 1, wherein the sensor blade has at least 1000 of the measurement sites at a density of greater than a single one of the measurement sites per square centimeter and less than 1,000,000 of the measurement sites per square centimeter.

15. The electronic feeler gauge according to claim 1, further comprising a computing system that is operatively coupled to the receiving system, wherein the computing system is configured to generate a 3D virtual model of a gap, probed by the sensor blade, based upon the response signals and the measurement sites.

16. The electronic feeler gauge according to claim 15, wherein the computing system is configured to identify suitable shims to be inserted into the gap by comparing dimensions of candidate shims to the 3D virtual model of the gap.

17. The electronic feeler gauge according to claim 15, wherein the computing system comprises a display and is configured to render an image of the 3D virtual model of the gap with the display.

18. The electronic feeler gauge according to claim 1, further comprising a computing system that is operatively coupled to the receiving system, wherein the computing system is configured to determine separation distances based upon the response signals, wherein the separation distances are at the measurement sites of the sensor blade between a first surface of a first workpiece and a second surface of a second workpiece.

19. The electronic feeler gauge according to claim 18, wherein the computing system is configured to identify suitable shims to be inserted into a gap, probed by the sensor blade, by comparing dimensions of candidate shims to the separation distances at the measurement sites.

20. The electronic feeler gauge according to claim 18, wherein the computing system comprises a display and is configured to display an image of the separation distances at the measurement sites on the display.

21. The electronic feeler gauge according to claim 18, wherein the computing system and the receiving system are configured to communicate wirelessly.

22. The electronic feeler gauge according to claim 1, further comprising a computing system that is operatively coupled to the receiving system, wherein:
the sensor blade, the transmitting system, and the receiving system are part of a handheld probe, and
the computing system is configured to wirelessly supply power to the handheld probe.

23. The electronic feeler gauge according to claim 1, wherein the receiving system is configured to generate separation distance signals based upon the response signals, wherein the separation distance signals are related to separation distances at the measurement sites of the sensor blade between a first surface of a first workpiece and a second surface of a second workpiece.

24. The electronic feeler gauge according to claim 1, wherein the transmitting system is configured to multiplex the transmitted probe signals by time-division multiplexing.

25. The electronic feeler gauge according to claim 1, wherein the receiving system is configured to receive at least one of the response signals for each of the reception induction coils.

26. The electronic feeler gauge according to claim 1, wherein each of the reception induction coils is individually electrically addressed by the receiving system.

27. The electronic feeler gauge according to claim 1, wherein the receiving system is configured to multiplex the response signals by time-division multiplexing.

28. The electronic feeler gauge according to claim 1, wherein the transmission induction coils are equal in number to the reception induction coils.

29. The electronic feeler gauge according to claim 1, wherein the reception induction coils are interspersed among the transmission induction coils in the sensor blade.

30. The electronic feeler gauge according to claim 1, wherein at least one of the reception induction coils overlaps with at least one of the transmission induction coils in the sensor blade.

31. The electronic feeler gauge according to claim 30, wherein each of the reception induction coils overlaps with at least one of the transmission induction coils in the sensor blade.

32. The electronic feeler gauge according to claim 1, wherein the transmission induction coils and the reception induction coils are separated by one or more dielectric layers.

33. The electronic feeler gauge according to claim 1, wherein the transmission induction coils and the reception induction coils are located in different layers within the sensor blade.

34. The electronic feeler gauge according to claim 1, wherein the reception induction coils comprise graphene.

35. The electronic feeler gauge according to claim 1, wherein the transmission induction coils are spiral planar inductors.

36. The electronic feeler gauge according to claim 1, wherein the reception induction coils are spiral planar inductors.

37. The electronic feeler gauge according to claim 1, wherein each of the reception induction coils has a lateral area of less than 1 square centimeter and greater than 100 square microns.

38. The electronic feeler gauge according to claim 1, wherein the sensor blade has a thickness that is less than 0.5 mm and greater than 0.001 mm.

39. The electronic feeler gauge according to claim 1, further comprising a computing system that is operatively coupled to the receiving system.

40. A method of measuring separation distances within a gap, the method comprising:
inserting a sensor blade into the gap, defined by a first surface and a second surface, wherein:
the sensor blade comprises transmission induction coils, reception induction coils, and measurement sites, spaced in two dimensions about the sensor blade, and
each of the measurement sites is associated with at least one of the transmission induction coils and at least one of the reception induction coils;
generating transmitted probe signals from the transmission induction coils by driving direct electrical current across the transmission induction coils;
receiving response signals with the reception induction coils in response to the transmitted probe signals; and
determining, by at least a processor of a computing system, the separation distances between the first surface and the second surface at the measurement sites based upon the response signals.

41. The method according to claim 40, wherein determining, by at least the processor of the computing system, the separation distances between the first surface and the second surface at the measurement sites based upon the response signals comprises determining, by at least the processor of the computing system, a magnitude measure for each of the response signals, wherein:
the magnitude measure is selected from the group consisting of amplitude, intensity, energy, and power,
each of the separation distances is associated with a corresponding one of the measurement sites, and the separation distances are related to the magnitude measures of the response signals of the reception induction coils, associated with corresponding ones of the measurement sites.

42. The method according to claim 40, further comprising creating a 3D virtual model of the gap based upon the separation distances at the measurement sites.

43. The method according to claim 42, further comprising selecting, by at least the processor of the computing system, one or more suitable shims to fit the gap based upon the 3D virtual model of the gap.

44. The method according to claim 42, further comprising identifying, by at least the processor of the computing system, suitable shims to fit the gap by comparing dimensions of candidate shims to the 3D virtual model of the gap.

45. The method according to claim 42, further comprising forming one or more suitable shims to fit the gap based upon the 3D virtual model of the gap.

46. The method according to claim 40, wherein:
generating the transmitted probe signals comprises:
generating a first one of the transmitted probe signals from one or more of the transmission induction coils, associated with a first one of the measurement sites; and
generating a second one of the transmitted probe signals from one or more of the transmission induction coils, associated with a second one of the measurement sites;
receiving the response signals with the reception induction coils in response to the transmitted probe signals comprises:
receiving a first one of the response signals with one or more of the reception induction coils in response to the first one of the transmitted probe signals; and
receiving a second one of the response signals with one or more of the reception induction coils in response to the second one of the transmitted probe signals; and
determining the separation distances between the first surface and the second surface at the measurement sites, based upon the response signals, comprises:
determining a first one of the separation distances between the first surface and the second surface at the first one of the measurement sites, based upon the first one of the response signals; and
determining a second one of the separation distances between the first surface and the second surface at the second one of the measurement sites, based upon the second one of the response signals.

47. The method according to claim 40, further comprising identifying, by at least the processor of the computing system, at least one of the measurement sites that is outside of the gap based upon the response signals from one or more reception induction coils, associated with the at least one of the measurement sites.

48. The method according to claim 40, further comprising selecting, by at least the processor of the computing system, one or more suitable shims to fit the gap based upon the separation distances at the measurement sites.

49. The method according to claim 40, further comprising displaying an image of the gap based upon the separation distances at the measurement sites.

50. The method according to claim 40, wherein:
the gap is a calibration gap with a known thickness profile between the first surface and the second surface;
the method further comprises calibrating an electronic feeler gauge that comprises the sensor blade by generating separation distance signals based upon the response signals and comparing the separation distance signals to the known thickness profile to generate calibration coefficients for the measurement sites; and
determining, by at least the processor of the computing system, the separation distances between the first surface and the second surface at the measurement sites based upon the response signals comprises determining the separation distances based upon the response signals and the calibration coefficients.

51. The method according to claim 50, wherein comparing the separation distance signals to the known thickness profile to generate calibration coefficients for the measurement sites comprises determining calibrated separation distances at the measurement sites.

52. The method according to claim 51, wherein comparing the separation distance signals to the known thickness profile to generate calibration coefficients for the measurement sites comprises determining one or more calibration coefficients for each of the measurement sites to mathematically transform the separation distance signals into the calibrated separation distances.

53. The method according to claim 52, wherein comparing the separation distance signals to the known thickness profile to generate calibration coefficients for the measurement sites comprises determining, by at least the processor of the computing system, one or more calibration coefficients for each of the measurement sites to linearly transform the separation distance signals into the calibrated separation distances.

54. The method according to claim 51, further comprising adjusting individual ones of the transmitted probe signals from the transmission induction coils according to the calibration coefficients to produce calibrated transmitted probe signals.

55. The method according to claim 54, further comprising:
generating the calibrated transmitted probe signals with the sensor blade in the calibration gap;
receiving calibrated response signals with the reception induction coils in response to the calibrated transmitted probe signals;
determining, by at least the processor of the computing system, calibrated separation distances between the first surface and the second surface at the measurement sites based upon the calibrated response signals; and
verifying that the calibrated separation distances match the known thickness profile.

56. The method according to claim 50, further comprising adjusting the separation distance signals according to the calibration coefficients to produce calibrated separation distances that match the known thickness profile.

57. The method according to claim 40, wherein generating the transmitted probe signals from the transmission induction coils comprises driving direct electrical current across the transmission induction coils to produce the transmitted probe signals.

58. The method according to claim 57, wherein the transmitted probe signals are steady-state magnetic fields.

59. The method according to claim 40, wherein generating the transmitted probe signals from the transmission induction coils comprises driving modulated signals across the transmission induction coils to produce the transmitted probe signals.

60. The method according to claim 59, wherein the transmitted probe signals are static alternating electromagnetic fields.

61. The method according to claim 59, wherein generating the transmitted probe signals from the transmission induction coils comprises frequency-division multiplexing modulated signals to the transmission induction coils.

62. The method according to claim 59, wherein generating the transmitted probe signals from the transmission induction coils comprises generating transmitted probe signals at different frequencies.

63. The method according to claim 59, wherein generating the transmitted probe signals from the transmission induction coils comprises generating transmitted probe signals at a common frequency.

64. The method according to claim 59, wherein receiving the response signals with the reception induction coils in response to the transmitted probe signals comprises frequency-division multiplexing response signals from the reception induction coils.

65. The method according to claim 59, wherein receiving the response signals with the reception induction coils in response to the transmitted probe signals comprises receiving response signals at different frequencies.

66. The method according to claim 59, wherein receiving the response signals with the reception induction coils in response to the transmitted probe signals comprises receiving response signals at a common frequency.

67. The method according to claim 40, wherein:
generating the transmitted probe signals from the transmission induction coils comprises generating transmitted probe signals that comprise a carrier wave at a carrier frequency;
receiving the response signals with the reception induction coils in response to the transmitted probe signals comprises receiving response signals that comprise a primary signal at the carrier frequency; and
determining, by at least the processor of the computing system, the separation distances between the first surface and the second surface at the measurement sites based upon the response signals comprises determining at least one of a relative amplitude, a relative modulation, and a phase shift of the primary signal relative to the carrier wave.

\* \* \* \* \*